United States Patent
Cansino et al.

(10) Patent No.: US 10,419,803 B2
(45) Date of Patent: *Sep. 17, 2019

(54) METHOD AND SYSTEM FOR USING A SECOND SCREEN DEVICE FOR INTERACTING WITH A SET TOP BOX TO ENHANCE A USER EXPERIENCE

(71) Applicant: The DIRECTV Group, Inc., El Segundo, CA (US)

(72) Inventors: Don E. Cansino, Redondo Beach, CA (US); Brady C. Tsurutani, Los Angeles, CA (US); Earl J. Bonovich, Tinley Park, IL (US); Charles W. Beeson, La Mirada, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 337 days.

This patent is subject to a terminal disclaimer.

(21) Appl. No.: 14/631,076

(22) Filed: Feb. 25, 2015

(65) Prior Publication Data
US 2015/0215663 A1 Jul. 30, 2015

Related U.S. Application Data

(63) Continuation of application No. 13/224,206, filed on Sep. 1, 2011, now Pat. No. 9,032,451.

(51) Int. Cl.
*H04N 21/41* (2011.01)
*H04N 21/4722* (2011.01)
(Continued)

(52) U.S. Cl.
CPC ... *H04N 21/4126* (2013.01); *H04N 21/42209* (2013.01); *H04N 21/42224* (2013.01);
(Continued)

(58) Field of Classification Search
CPC ........... H04N 21/4122; H04N 21/4126; H04N 21/4104
See application file for complete search history.

(56) References Cited

U.S. PATENT DOCUMENTS 7,581,237 B1 8/2009 Kurapati
2002/0154888 A1 10/2002 Allen et al.
(Continued)

OTHER PUBLICATIONS

Final Rejection dated Aug. 10, 2015 in U.S. Appl. No. 14/191,288, filed Feb. 26, 2014 by Don E. Cansino et al.
(Continued)

*Primary Examiner* — Fernando Alcon
(74) *Attorney, Agent, or Firm* — Harness, Dickey & Pierce, P.L.C.

(57) ABSTRACT

A system and method for displaying data related to a content displayed through a set top box includes a second screen device generating a content information request signal requesting data corresponding to the content, communicates the content information request signal to the set top box. The set top box communicates a content information signal to the second screen device comprising a content identifier. The second screen device generates a request for related data signal corresponding to the content using the content identifier, communicates the request for related data signal through a network, receives aggregated related content data corresponding to the content from a data services center and displays the aggregated related content data.

47 Claims, 23 Drawing Sheets

(51) Int. Cl.
*H04N 21/4788* (2011.01)
*H04N 21/482* (2011.01)
*H04N 21/61* (2011.01)
*H04N 21/422* (2011.01)

(52) U.S. Cl.
CPC ..... *H04N 21/4722* (2013.01); *H04N 21/4788* (2013.01); *H04N 21/482* (2013.01); *H04N 21/6143* (2013.01); *H04N 21/6175* (2013.01)

(56) References Cited

U.S. PATENT DOCUMENTS

| | | | |
|---|---|---|---|
| 2002/0157101 A1* | 10/2002 | Schrader | H04N 5/4401 |
| | | | 725/64 |
| 2003/0220830 A1 | 11/2003 | Myr | |
| 2006/0085835 A1 | 4/2006 | Istvan et al. | |
| 2007/0101394 A1 | 5/2007 | Fu et al. | |
| 2010/0333142 A1 | 12/2010 | Busse et al. | |
| 2011/0063503 A1* | 3/2011 | Brand | H04N 5/4401 |
| | | | 348/500 |
| 2011/0090402 A1 | 4/2011 | Huntington et al. | |
| 2012/0078937 A1 | 3/2012 | Hall | |
| 2012/0174155 A1 | 7/2012 | Mowrey et al. | |
| 2014/0067961 A1 | 3/2014 | Archibong et al. | |

OTHER PUBLICATIONS

Final Rejection dated Aug. 7, 2015 in U.S. Appl. No. 14/191,276, filed Feb. 26, 2014 by Don E. Cansino et al.

* cited by examiner

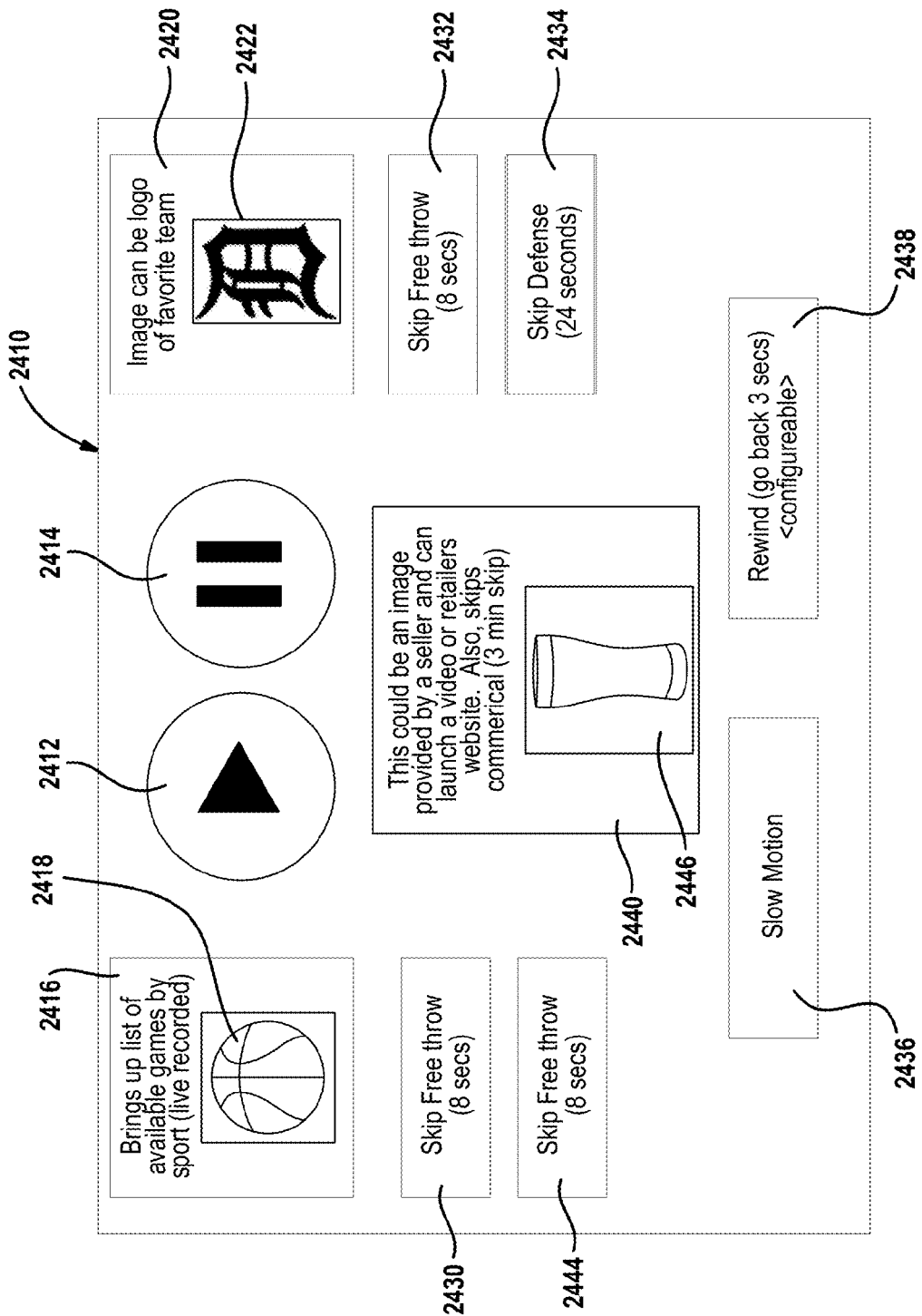

METHOD AND SYSTEM FOR USING A SECOND SCREEN DEVICE FOR INTERACTING WITH A SET TOP BOX TO ENHANCE A USER EXPERIENCE

TECHNICAL FIELD

The present disclosure relates generally a television programming delivery system, and, more specifically, to using a second screen device to enhance a user experience by providing data about programming or controlling a set top box or both.

BACKGROUND

The statements in this section merely provide background information related to the present disclosure and may not constitute prior art.

Television content providers are continually increasing the amount of television content provided. In addition to the actual television programming content, television providers also provide limited information regarding the content such as a brief description, running time, parental ratings, and the like. The limited data may be metadata delivered with the content or guide data and may be delivered directly to the set top box. Content users increasingly desire further information relative to the content.

Mobile devices such as touch-screen mobile devices have also increased in popularity. Such devices are typically connectable to the internet to obtain content from various sources. Mobile touch-screen devices include the iPad® by Apple and various android operating system devices.

SUMMARY

The present disclosure provides a system and method for using a second screen device for interacting with a set top box to enhance the user experience. The second screen device allows a user to interact with the set top box and obtain data related to the content displayed at the set top box. Various types of data modules may be established so that a customizable user interface may be formed.

In one aspect of the disclosure, a method includes displaying content on a display associated with a set top box, generating a content information request signal at a second screen device requesting data corresponding to the content, communicating the content information request signal to the set top box, communicating a content information signal to second screen device from the set top box comprising a content identifier, generating a request for related data signal corresponding to the content at the second screen device using the content identifier, communicating the request for related data signal from the second screen device, aggregating related content data corresponding to the content to form an aggregated related content data signal, communicating the aggregated related content data signal to the second screen device and displaying the aggregated related content data at the second screen device.

In a further aspect of the disclosure, a system for displaying data related to a content displayed through a set top box includes a second screen device generating a content information request signal requesting data corresponding to the content, communicates the content information request signal to the set top box. The set top box communicates a content information signal to second screen device comprising a content identifier. The second screen device generates a request for related data signal corresponding to the content using the content identifier, communicates the request for related data signal through a network, receives aggregated related content data corresponding to the content from a data center and displays the aggregated related content data.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 24 is a screen display of an event-specific remote control.

DETAILED DESCRIPTION

Figure 1:
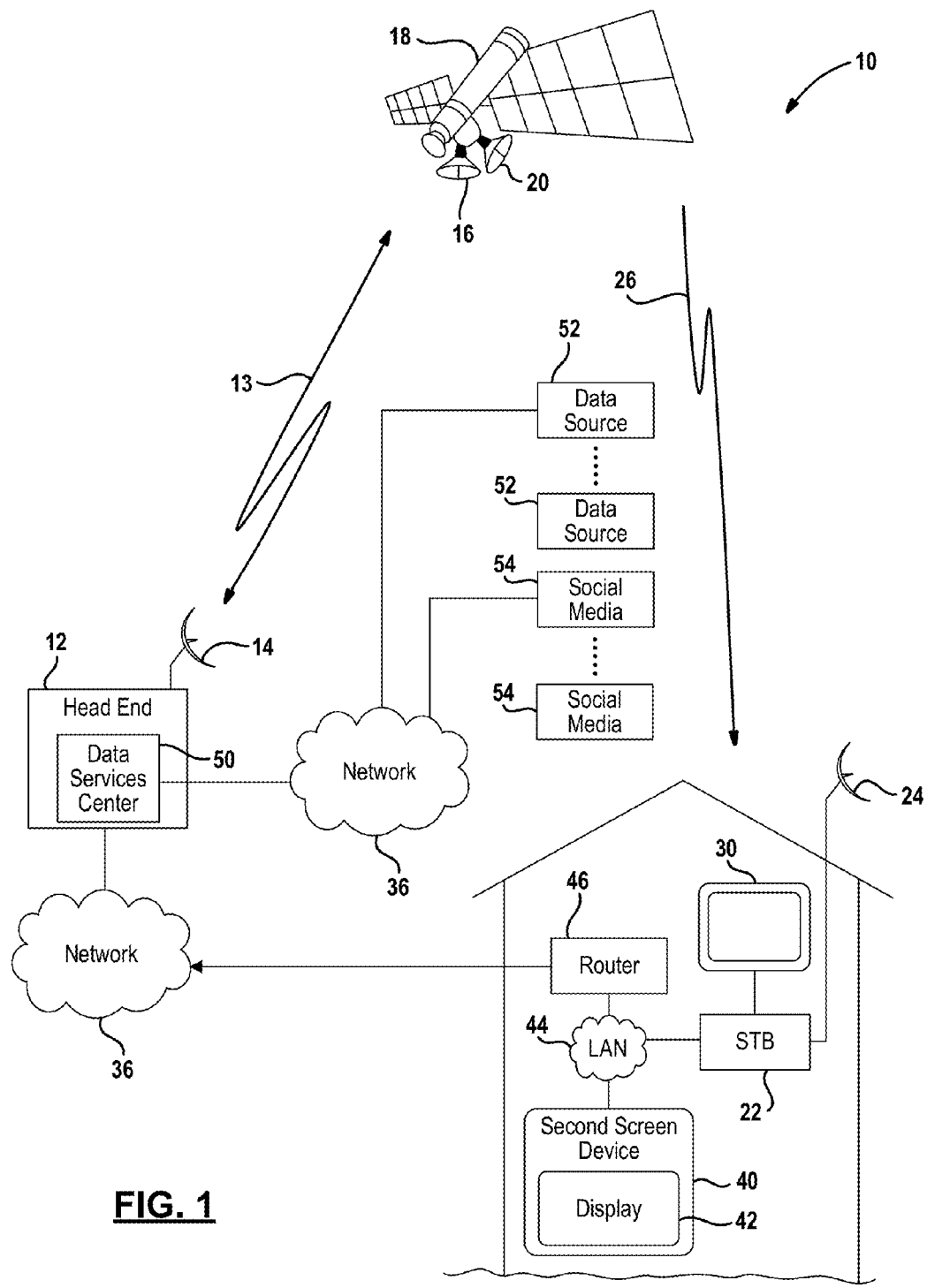
FIG. 1 is a block diagrammatic view of a communication system for content playback and delivery according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Further, while the following disclosure is made with respect to the delivery of content (e.g., television (TV), movies, games, music videos, etc.), it should be understood that the systems and methods disclosed herein could also be used for delivery of any media content type, for example, audio, music, data files, web pages, games, etc. Additionally, throughout this disclosure reference is made to programs, data, information, movies, assets, video data, etc., however, it will be readily apparent to persons of ordinary skill in the art that these terms are substantially equivalent in reference to the example systems and/or methods disclosed herein. As used herein, the term title or program will be used to refer to the movie or program name.

Referring now to FIG. 1, a satellite television broadcasting system 10 is illustrated. The satellite television broadcast system 10 includes a head end 12 that generates wireless signals 13 through an antenna 14 which are received by an antenna 16 of a satellite 18. The wireless signals 13, for example, may be digital. The wireless signals 13 may be referred to as an uplink signal. A transmitting antenna 20 generates downlink signals that are directed to various receiving systems including stationary systems such as those in the home, as well as, mobile receiving systems. A set top box 22 is an example of a stationary receiving system that may be placed at different locations relative to the display or television. The set top box 22 is in communication with an antenna 24. The antenna 24 receives downlink signals 26 from the transmitting antenna 20 of the satellite 18.

The head end 12 may communicate various content, program guide data or other data through the satellite 18. The set top box 22 may receive the content and data. A plurality of set top boxes 22 may be provided in a system. The plurality of set top boxes 22 may be located within a single building or household.

The set top box or boxes 22 each have a display 30 associated therewith. The display 30 may be a television or monitor used for displaying video images and providing an audio output.

A network may be used to connect the head end with various device included the set top box 22. The network 36 may be one type of network or multiple types of networks. The network 36 may, for example, be a public switch to telephone network, the internet, a mobile telephone network or other type of network.

The system 10 may also include a second screen device 40. The second screen device 40 may be various types of devices including a mobile phone, a laptop, or a touch screen device or computer. The second screen device 40 may have a screen display 42 used for displaying various types of information as will be set forth further below. The second screen device 40 is referred to as such because it is used together with the display 30 associated with the set top box 22.

A local area network (LAN) 44 may also be incorporated into the system. The local area network 44 may be in communication with the set top box 22 and the second screen device 40. The local area network 44 may be a wireless local area network.

The local area network 44 may also include a router 46. The router 46 may allow the devices within the local area network 44 to communicate. In this example, the local area network 44 may allow the second screen device 40 and the set top box 22 to communicate. The router 46 may also communicate with the network 36.

A data services center module 50 (data services center) may be in communication with the head end 12. The data services center 50 may also be included in the head end 12 as is illustrated. The data services center 50 is in communication with the network 36 to gather various data. As mentioned above, the network 36 may be the internet. The data services center 50 may gather data from various data sources 52 and act as a data server for distributing the data. The data sources 52 may include data sources 52 for different types of data related to the content provided. Examples of data will be provided below. In general, the data may include actor information, pictures, posters, sports scores, and the like.

Another source of data in communication with the data services center 50 is a social media source 54. Various types of social media sources may be used including websites. Blogs, Twitter®, and Facebook® are examples of social media sources or websites. The data services center 50, as will be described below, may aggregate data from the various sources. The data may be aggregated and indexed in a database with the head end 12 or data services center 50 to correspond to a content identifier as will be described below.

Figure 2:
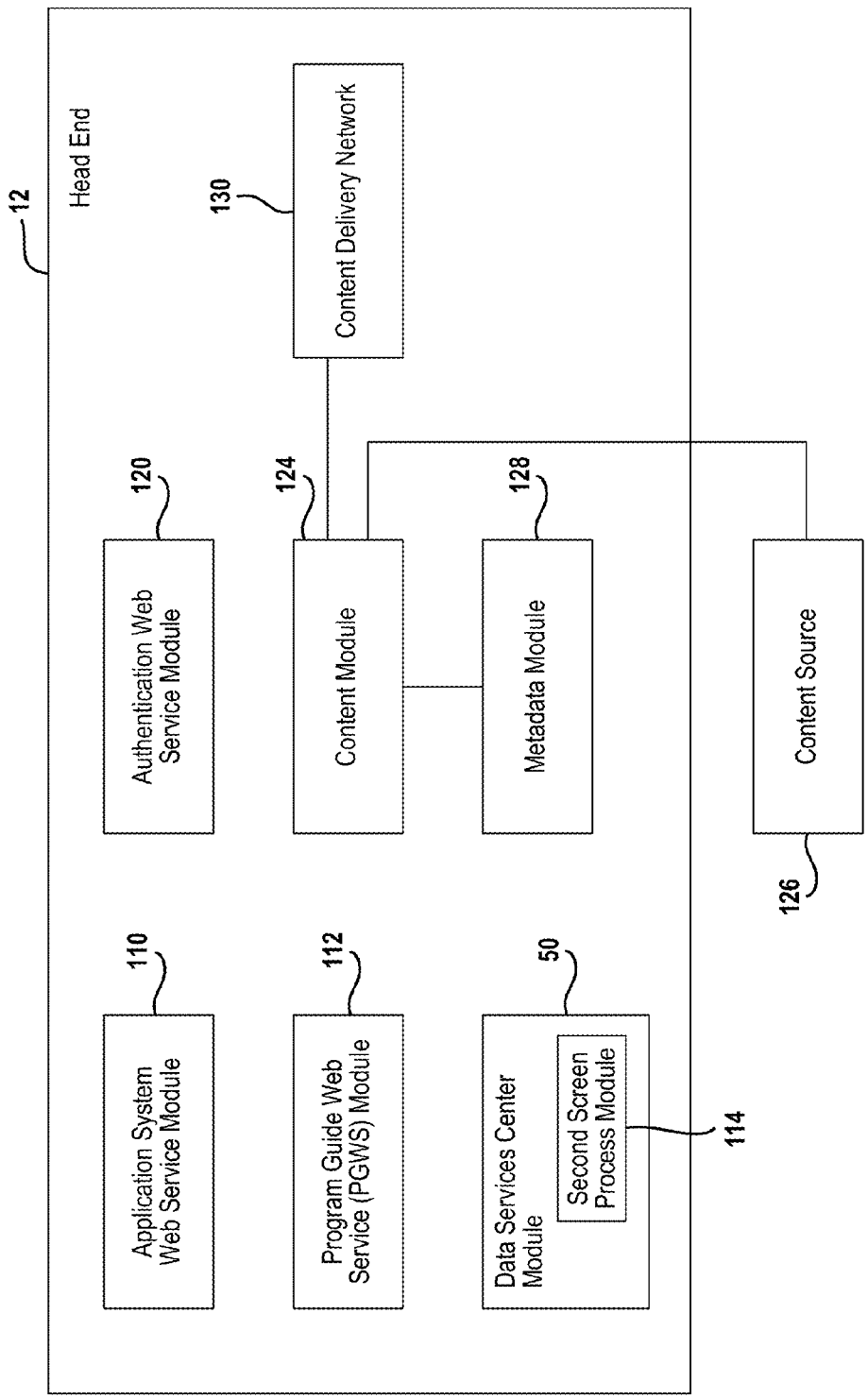
FIG. 2 is a high-level block diagrammatic view of the head end of FIG. 1.

Referring now to FIG. 2, the head end 12 is illustrated in further detail. The head end 12 may include various modules that are interconnected. The interconnections have been eliminated in the figure for simplicity. The head end 12 is illustrated as being within one facility. However, various numbers of facilities with different numbers of modules may be used in an actual implementation.

The head end 12 may include an application system web service module 110. The application system web service module 110 may be a configuration service that provides site definitions, host uniform research locators and application settings. The application system web service module 110 may be used to call other web services such as the program guide web service 112. Interaction of the application system web service 110 will be further described below.

The program guide web service module 112 provides a listing of content to various devices including the set top box 22. The program guide web service module 112 may provide details for a grid guide or specific data for a specific channel. The program guide web service module 112 may deliver the program data, channel data, or other forms of data to the second screen device through the network 36 illustrated in FIG. 1.

The data services center 50 is also illustrated as being incorporated within the head end 12. The data services center 50 may include a second screen process module 114 for providing second screen data to second screen devices with the system. As mentioned above, the data services center 50 may be used to aggregate various data from various sources so that it may be provided to the second screen device upon request.

The head end 12 may also include an authentication web service module 120. The authentication web service 120 may act as a look-up service to authenticate a user device such as the set top box or the second screen device. The authentication web service module 120 may also be used as a setup service that is used to setup the second screen device based on various user parameters. Such user parameters may include the type of device and the services subscribed to. Some services may be selectively provided to user devices for a fee.

The head end 12 may also include a content module 124. The content module 124 may store content therein. The content module 124 may store movies or sports or other on-demand types of content. The content module 124 may also be used to communicate live content to users from a content source 126. The content source 126 may provide live or linear content. Linear content is content that is broadcasted at a pre-scheduled time according to a pre-determined schedule. Non-linear content, such as on-demand content, is broadcasted upon request and not according to a preset schedule.

A metadata module 128 may also provide data that is broadcasted with the content. The metadata module 128 may also provide data to the program guide web service 112. The metadata module 128 may also include close-captioning, ratings data, or other data that is broadcasted with the content or program guide.

A content delivery network 130 is used to broadcast content to the set top boxes. The content delivery network 130 may broadcast formatted signals such as packetized signals. The formatted signals may be broadcasted through the satellite 18 or may be communicated through the network 36 illustrated in FIG. 1.

Figure 3:
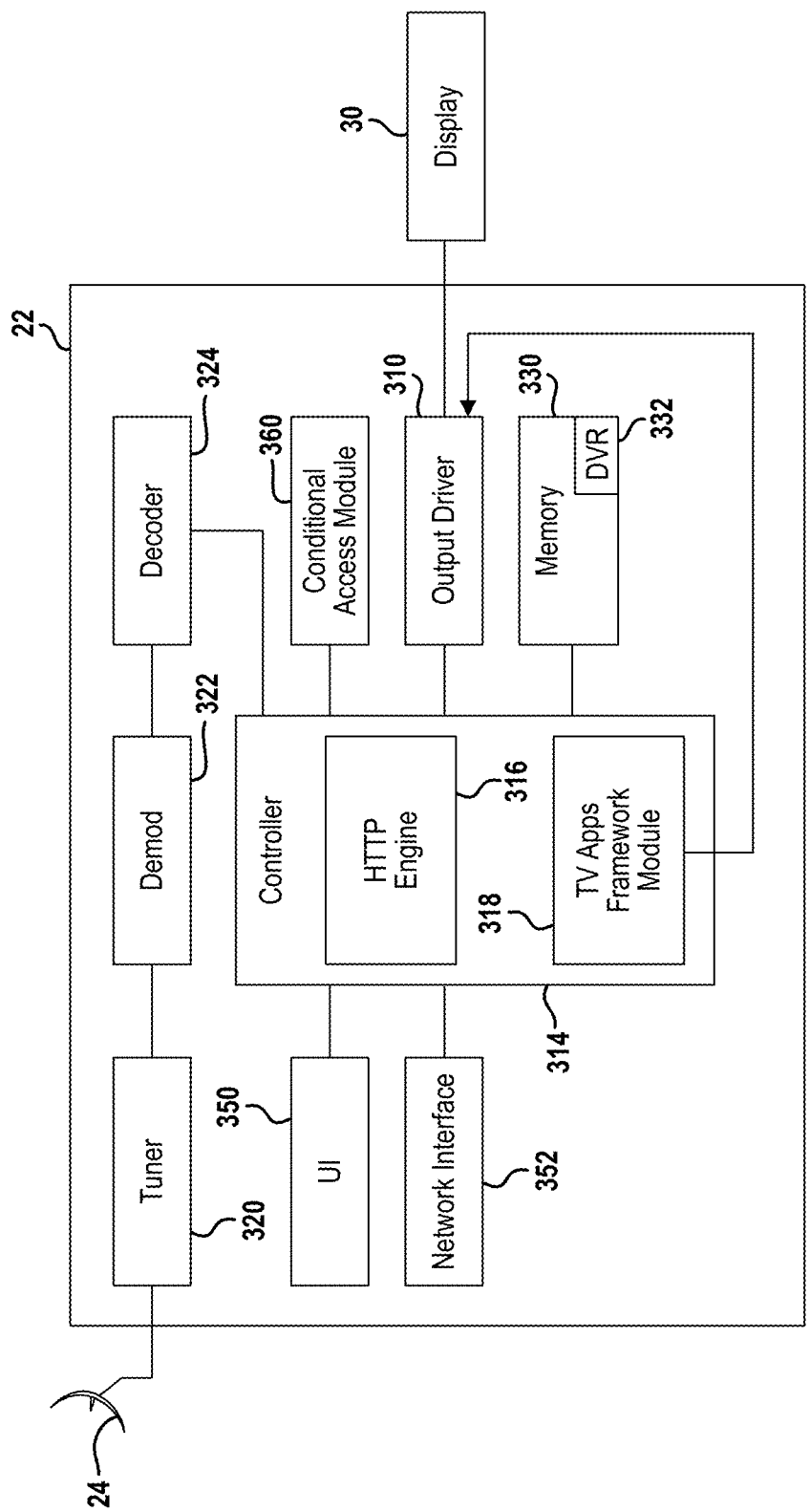
FIG. 3 is a high-level block diagrammatic view of the set top box of FIG. 1.

Referring now to FIG. 3, the set top box 22 is illustrated in further detail. Although, a particular configuration of the set top box 22 is illustrated, it is merely representative of various electronic devices with an internal controller used as a content receiving device. The antenna 24 may be one of a number of different types of antennas that may include one or more low noise blocks associated therewith. The antenna 24 may be a single antenna used for satellite television reception. Of course, multiple antennas for different orbital slots may be used. In a cable system no antenna may be used. Rather, a connector to a cable may be used. The set top box 22, as described above, is coupled to a display 30. The display 30 may have an output driver 310 within the set top box 22.

A controller 314 may be a general processor such as a microprocessor that cooperates with control software. The controller 314 may be used to coordinate and control the various functions of the set top box 22. These functions may include a tuner 320, a demodulator 322, a decoder 324 such as a forward error correction decoder and any buffer or other functions.

The tuner 320 receives the signal or data from the individual channel. The tuner 320 may receive data from a satellite or a terrestrial source such as a cable. The tuner 320 may receive television programming content, program guide data or other types of data. The demodulator 322 demodulates the signal or data to form a demodulated signal or data. The decoder 324 decodes the demodulated signal to form decoded data or a decoded signal. The controller 314 may be similar to that found in current DIRECTV® set top boxes which uses a chip-based multifunctional controller. Although only one tuner 320, one demodulator 322 and one decoder 324 are illustrated, multiple tuners, demodulators and decoders multiple tunes, demodulators and decoders may be provided within a single set top box 22.

The controller 314 may also include a hypertext transfer protocol (HTTP) engine module 316 and a television application framework module 318. The HTTP engine module 316 (HTTP engine) is used to receive commands through the local area network 44. The commands in this example are received from the second screen device 40. The HTTP engine module 316 receives the commands that are acted upon by the controller 314. When the HTTP signals are received at the HTTP engine 316 are remote control commands, the HTTP engine exposes the underlying commands from the signal which are acted upon by the controller 314. The remote control commands may be the same commands that are used by a remote control device that are used to control the set top box 22.

The television (TV) application framework module 318 is used for launching various applications such as a widget that is viewable on the television. The widgets may be displayed on top of the video on the display 30. In this particular example, the television application framework module 318 may be used to communicate with the data services center 50 illustrated in FIG. 1. The TV application framework module 318 may request data for user accounts, program information, sports data, or the like from the data services center 50. The TV application framework module 318 may receive the requested data and display the data in a particular format or position on the display 20.

The controller 314 is in communication with a memory 330. The memory 330 is illustrated as a single box. The memory 330 may actually be a plurality of different types of memory including the hard drive, a flash drive and various other types of memory. The memory 330 may be other types of memory or sections of different types of memory. The memory 330 may be non-volatile memory or volatile memory.

The memory 330 may include storage for various operational data collected during operation of the set top box 22. For example, the memory 330 may store various types of data including set top box playlist data that has the playlist for content saved within the memory 330. Another type of data stored in the memory is the favorite settings for the set top box 22. Another type of data in the memory 330 may include the channels subscription data, the blocked channels, adult channels, rating limits set by the set top box 22, current set top box language, prioritizer data, TV resolution data, to do list data, the conditional access module identifier, time zone data, time of day daylight savings, status data, aspect ratio data, viewing hours data, quick tune list and a zip code.

The memory 330 may also store the advanced program guide data. The memory 330 may store program guide data that is received at the head end. The program guide data may include amounts of data including two or more week's worth of program guide data. The program guide data may be communicated to the set top box 22 in various manners including through the satellite 18 of FIG. 1. The program guide data may include a content or program identifiers, and various data objects corresponding thereto. The content identifier may include series data. The first 4 digits may, for example, identify the series. The program guide may include program characteristics for each program content. The program characteristic may include ratings, categories, actor, director, writer, content identifier, producer data and event type. The data may also include various other settings.

The memory 330 may also include a digital video recorder 332. The digital video recorder 332 may be a hard drive, flash drive, or other memory device. A record of the content stored in the digital video recorder is a playlist. The playlist may be stored in the DVR 332 or other parts of memory 330.

The set top box 22 may also include a user interface 350. The user interface 350 may be various types of user interfaces such as a keyboard, push buttons, a touch screen, a voice activated interface or the like. The user interface 350 may be used to select a channel, select various information, change the volume, change the display appearance, or other functions. The user interface 350 may also be used for selecting recommendation and providing feedback for recommendations as will be described below.

A network interface 352 may be included within the set top box 22 to communicate various data through the networks 36/44 described above. The network interface 352 may be a WiFi, WiMax, WiMax mobile, wireless, cellular, or other types of communication systems. The network interface 352 may use various protocols for communication therethrough including, but not limited to, hypertext transfer protocol (HTTP).

The set top box 22 may also include a conditional access module 360. The conditional access module 360 prevents unauthorized reception of the television signals through the antenna 24. The conditional access module 360 may use a cryptographic hash to authorize the use and display of the received signals.

Figure 4:
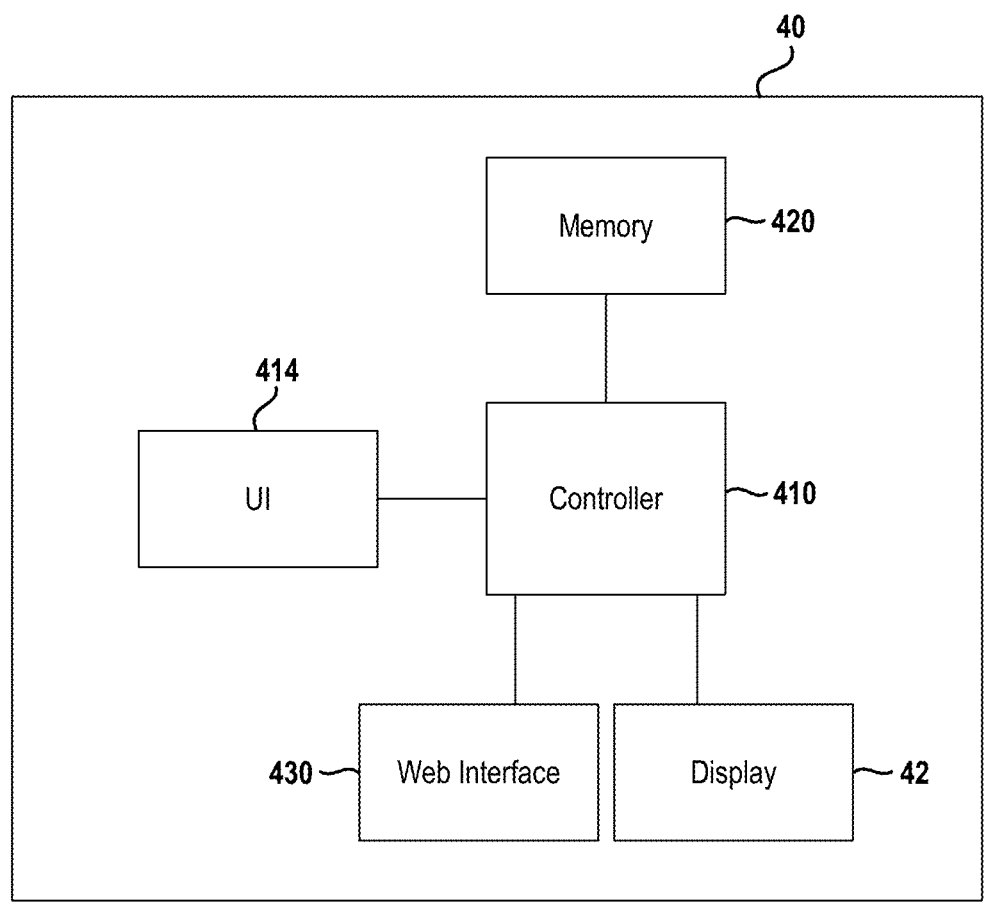
FIG. 4 is a high-level block diagrammatic view of a second screen device of FIG. 1.

Referring now to FIG. 4, a block diagrammatic view of the second screen device 40 illustrated in FIG. 1 is set forth. As mentioned above, the second screen device 40 is a user device that includes a display or screen. The second screen device 40 may be a tablet computer, a laptop computer, a mobile phone, or the like. One example of such a device is an iPad® Apple Corp. The second screen device 40 includes a controller 410. The controller 410 may include a central processing unit that is microprocessor-based. The controller 410 performs various functions including controlling a screen display 42. The controller 410 is also in communication with a user interface 414. The user interface 414 may be one or a combination of different types of user interfaces depending upon the device. Many tablet computers include push-buttons or touch screens or both. Keyboards, styluses and other types of input devices may also be used as a user interface 414 of the second-screen device. The user interface 414 is used to provide various inputs and responses to elements displayed on the screen display 42. When the user interface is a touch screen or touch display, the screen display 42 and the user interface 414 may be one in the same. More than one user interface 414 may be incorporated into the second screen device 40.

A memory 420 is also in communication with the controller 410. The memory 420 may include different types of memory that store different types of data. The memory 420 may store operating software for the device, operating data, user settings, video, music, documents, and applications. The applications may perform various functions, including an application for communicating with a set top box 22 illustrated in FIGS. 1 and 3 and obtaining data from the set top box and data services center. The application may allow the second screen device 40 to communicate directly with the data service center 50. A web interface 430 may be used for communicating with the data services center 50 and the set top box 22. The web interface 430 may allow a connection to the network 36 and network 44. The web interface 430 may allow communication through a wireless network such as a local area network, a wide area network or a mobile or cellular network.

In the present example, the controller 410 allows the user to customize the screen display 42 to display various types of data in a user-controlled format. That is, the screen display 42 may be customized to display the data desired by the user. The second screen device 40 may act as an extension of the set top box 22 and display 30 as illustrated in FIG. 1 to display additional information about the programming shown through the set top box 22. The data is received through the web interface 430.

Figure 5:
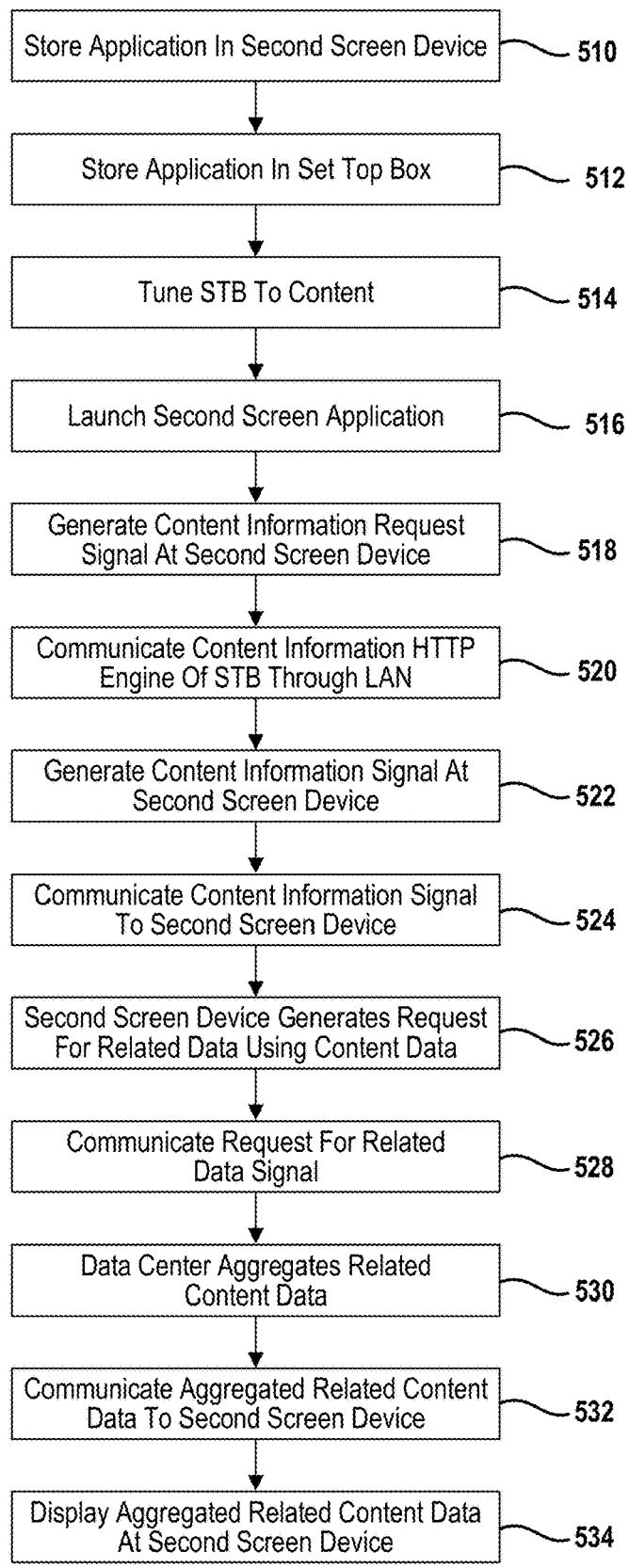
FIG. 5 is a flowchart of a method for displaying related data on a second screen device associated with the set top box.

Referring now to FIG. 5, a method for using the second screen device 40 to display related content to enhance the viewing experience of the user is set forth. Different types of data from different sources may be displayed on the second screen device.

In step 510, an application is stored in a memory of the second screen device 40. An application is a program that interacts with the user interface and the controller to perform a function. In this example, the second screen device and the set top box interact to receive and transmit specific content data using the application. In step 512, an application is stored in the set top box. The application in the set top box, in this example, allows the set top box to communicate with the second screen device and provide data thereto. The data may be data about or related to video content. Also, the application within the set top box controls the display associated with the set top box to display various data associated with the application.

In step 514, the set top box is tuned to various content. The set top box may be tuned to live television which is referred to as linear content. The display associated with the set top box may thus display content in real time. The set top box may also be used to playback content from a digital video recorder. Thus, content stored within the digital video recorder is played back and displayed on the screen display. The content displayed on the screen display may have a content identifier associated therewith. The content identifier and other metadata may be displayed but, is used to identify the content. The broadcasting system typically associates a content identifier with the content.

In step 516, a second screen application is launched at the second screen device. The process for authentication and the like is set forth in greater detail below. In step 518, a content information request signal is generated at the second screen device. The content information request signal may be communicated to the HTTP engine of the set top box. The content information request signal may thus use HTTP to configure the request. In step 520, the content information request signal is communicated to the HTTP engine of the set top box through the local area network.

In step 522, a content information request signal is generated at the set top box. The content information signal may include a content identifier corresponding to the content being displayed from the set top box. That is, the content information signal may include a content identifier. The content identifier may be an alphanumeric identifier uniquely identifying the content being displayed through the set top box. Other information may also be included in the content information signal including program characteristics including a series identifier, episode identifier, event type identifier, date identifiers, ratings, category, actor, director, writer, title and the like. The content information signal may also include channel data. The channel data may include a channel identifier for the channel to which the set top box is currently tuned. The channel data may also include the channel or network or both from which the content was recorded when a recording is played back through the set top box. The show or content name and episode data may be used for identifier rather than an alphanumeric identifier.

In step 524, the content information signal is communicated to the second screen device. The content information signal may be communicated through the HTTP engine 316 illustrated in FIG. 3. Thus, the content information signal may be formatted in an HTTP format.

In step 526, the second screen device receives the content information signal and generates a request for related data signal using the content data received in the content information signal. The second screen device may generate the request for related data in an HTTP protocol. In step 528, the request for related data signal is communicated to the data services center 50 illustrated in FIG. 1. The data services center 50, as mentioned above, may be part of the head end 12 or a separate server. The request for related data signal may be communicated through the local area network 44, the router 46 and the network 36 illustrated in FIG. 1.

In step 530, the data center aggregates related content data from various sources. As mentioned above, the data sources 52 may comprise various websites and the like. A social media website may also be used for the aggregated data. The content may be aggregated and coordinated based upon a content identifier. The data services center 50 may aggregate data upon request or may aggregate data continually so that it is available upon request. The aggregated data may include, but is not limited to, pictures, social commentary, trivia, ratings, merchandize procurement services, or other types of data.

In step 532, the aggregated related content data generated in step 530 is communicated to the second screen device. The aggregated related content data may be communicated directly to the second screen device using HTTP. In step 534, the aggregated related content data at the second screen device is displayed. As will be described further below, the data may be displayed in user-selectable modules corresponding to the specific type of data.

Figure 6:
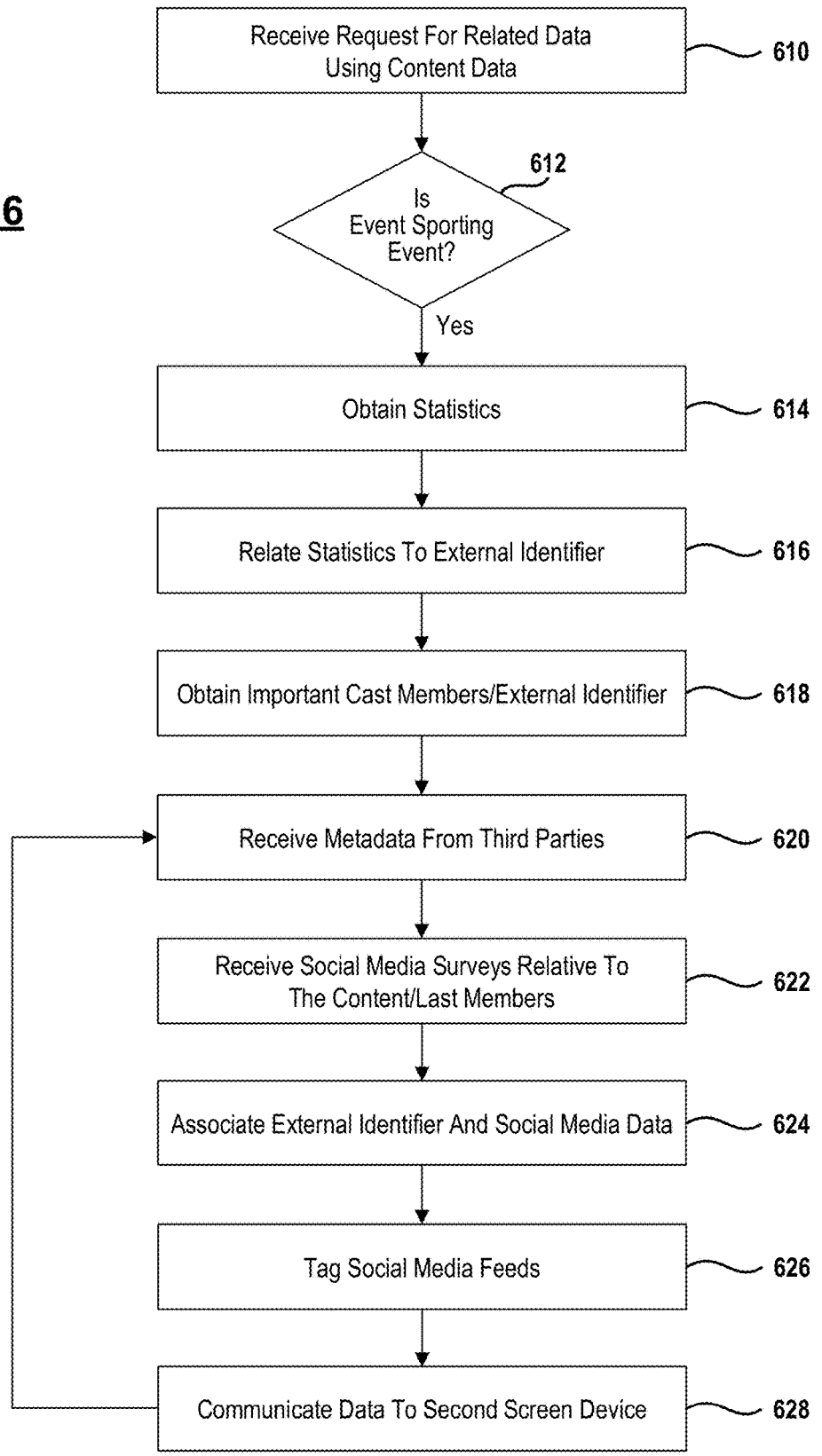
FIG. 6 is a flowchart of a method for aggregating related data.

Referring now to FIG. 6, details for the second screen algorithm for obtaining related data as set forth in step 530 is described further. In step 610, a request for related data is received by the data services center. As mentioned above, the request for related data includes a content identifier. At least a portion of the content identifier may be an event type identifier that identifies the type of event. In step 612, it is determined whether the event is a sporting event by the data in the content identifier or the event type identifier. Certain data codes may correspond to a sporting event (sporting event identifier) or a specific type of sporting event. If the event is a sporting event, statistics may be obtained in step 614. Statistics may be obtained for the current event and also for related events. For example, if football is being watched for a particular game, other football scores may be displayed. The different types of sporting events displayed and the content desired may be chosen by the user in a sports module. In step 616, the related statistics to the external identifier may be obtained.

In step 618, the important cast members for a particular content may be obtained. This may be obtained using the content provider. It should also be noted that an external identifier may also be used for obtaining content. External content data services such as Tribune Media Services® provides related data based upon identifiers. The content identifier may thus be converted to an external identifier in step 618. In step 620, metadata may be obtained from third parties. The metadata is related to the content identifier or the external identifier.

In step 622, social media sources may also provide data relative to the content. For example, cast members data may be obtained from social media sources. Post from cast members may be collected and displayed. An actor's Twitter® feed may be collected and displayed. Pictures or posters of cast members of content, biographical information, as well as descriptions provided from the social media feeds, may be provided. Social media events may be aggregated, categorized and evaluated based upon the frequency of a particular name of a cast member or of a television show. For example, content may be aggregated from multiple social media sources relative to a characteristic of the content including an actor, title or the like. Recommendations for content or information may also be provided based upon the frequency of the particular name within social media source websites.

In step 624, the external data identifier is correlated or associated with the social media data. A lead actor of a movie or television program may thus be associated with a content identifier for the particular program. In step 626, social media feeds may also be tagged with the external identifier. The social media feeds may also be provided directly to the second screen device in response to the content identifier.

In step 628, the data from steps 610-624 may be communicated to the second screen device. The data may be in a predetermined format such as HTTP. After step 628, step 620 is again performed. This process may be performed continually so that related data may be updated and communicated to the second screen device.

Figure 7A:
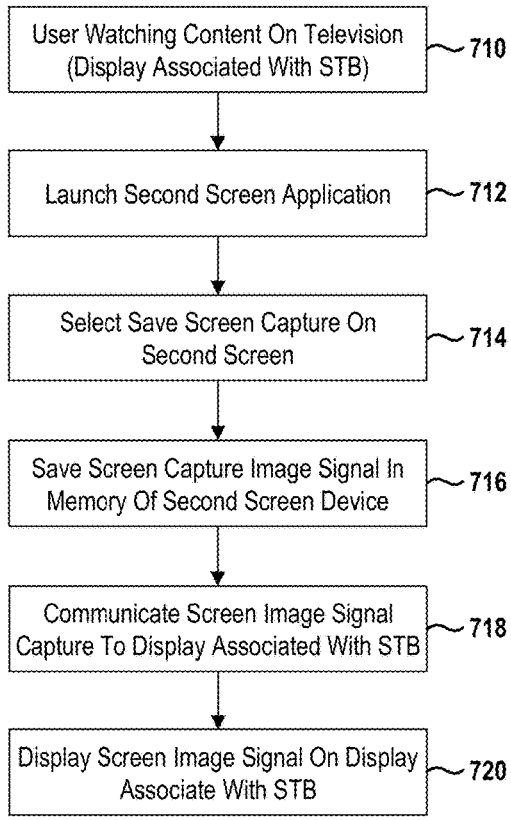
FIG. 7A is a flowchart of a method for sharing the screen display of the second screen device with the display associated with the set top box.

Referring now to FIG. 7A, a method for sharing second screen images is set forth. By sharing an image on the television, multiple people can view the screen display or an image signal thereof. In this example, the second screen image may be shared with the television associated with the set top box.

In step 710, the user is watching content on a television associated with a set top box. As mentioned above, the television may be a display associated with the set top box. In step 712, a second screen application is launched at a second screen device. The second screen application for saving a screen shot or image may be a push button within another application. In step 714, after the second screen application for saving a screen shot image is selected by the user interface of the second screen device, step 714 selects the screen capture on the second screen. This may be performed by initiating a screen share application on the second screen device. In step 716, the captured screen image is stored in the memory of the second screen device. In step 718, the screen image signal is communicated to the display associated with the set top box. Details of the communication between the set top box and the second screen device are provided in FIGS. 7A and 7B below.

In step 720, the captured screen image is displayed on the display associated with the set top box. This process will also be described further in FIGS. 8 and 9.

Figure 7B:
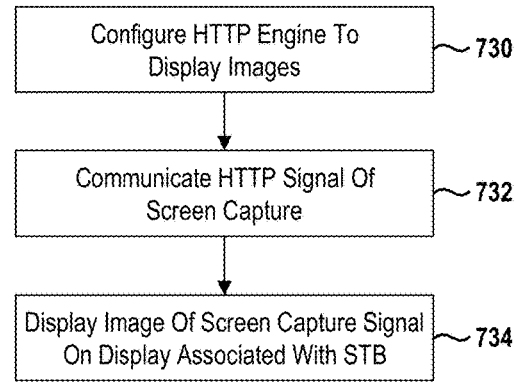
FIG. 7B is a flowchart of a method for displaying an image of a screen capture signal associated on a display associated with the set top box.

Referring now to FIG. 7B, one method for communicating and displaying a captured screen image is set forth. In step 730, the HTTP engine of the set top box may be configured to display images. In step 732, an HTTP signal of the captured screen display may be communicated to the set top box. In step 714, the image of the captured screen display is displayed on the set top box. Various methods for initiating the display on the display associated with the set top box may be provided. An application may be launched using the TV apps framework module 318 of FIG. 3 for displaying the captured screen display.

Figure 7C:
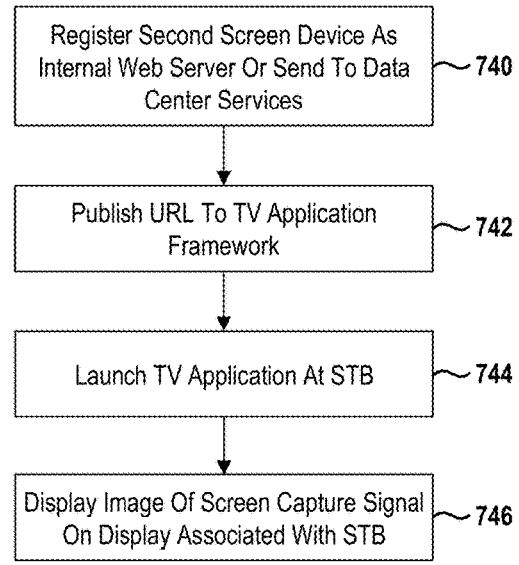
FIG. 7C is an alternative method for displaying an image of the screen capture signal on a display associated with the set top box.

Referring now to FIG. 7C, another method for displaying the screen display is set forth. In step 740, the second screen device may be registered as an internal web server or the captured screen image data may be sent to the data services center illustrated in FIG. 1.

In step 742, the universal resource locator (URL) may be communicated to the television apps framework module 318 illustrated in FIG. 3. In step 744, a TV application at the set top box may be launched by a user interface associated with the set top box. Menu displays may be used for initiating the TV application.

In step 746, an image of the screen display may be displayed on the display associated with the set top box.

Figure 8:
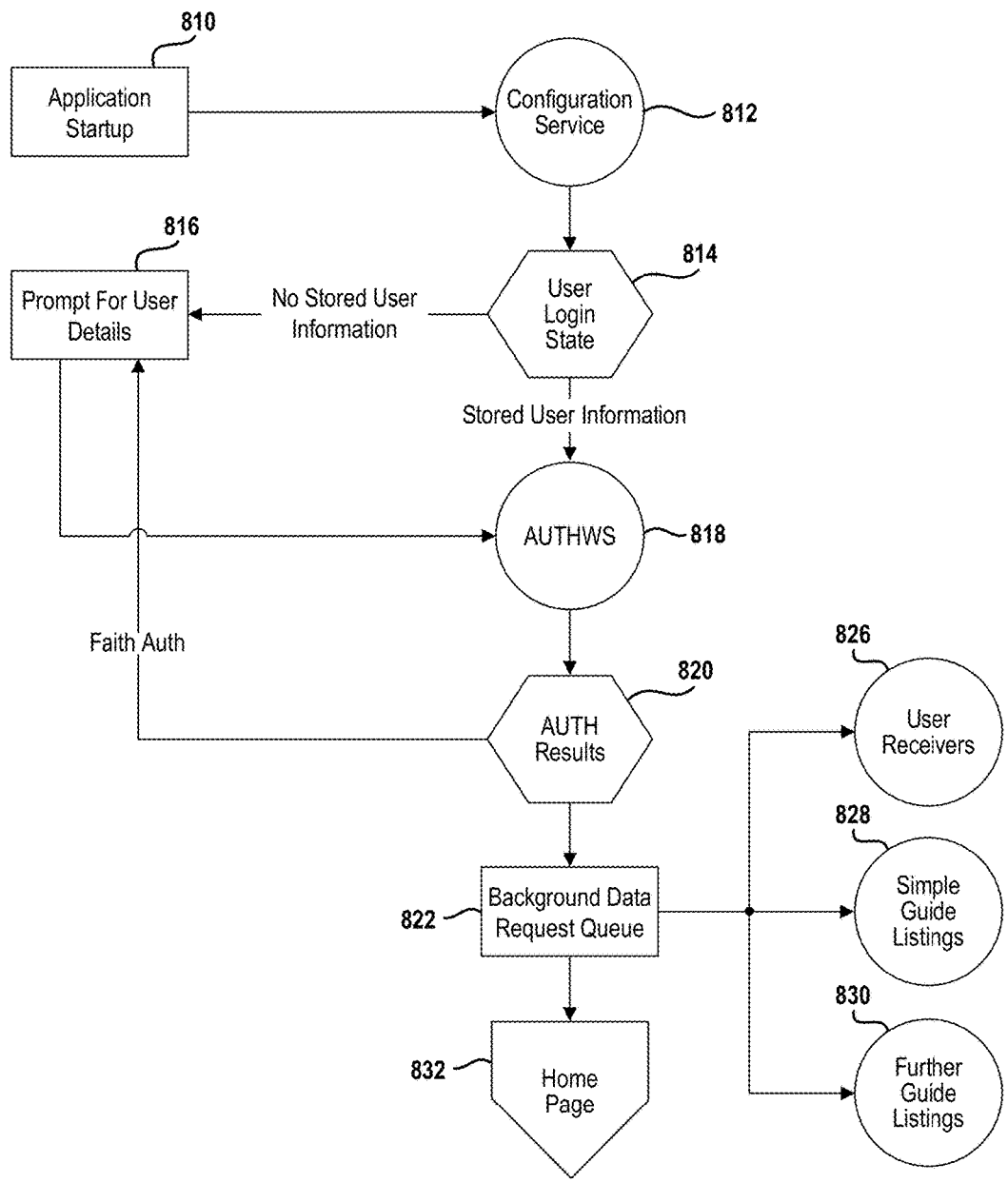
FIG. 8 is a flowchart of a method for starting the application on the second screen device.

Referring now to FIG. 8, a detailed flowchart illustrating the interaction with the components of the head end and the second screen device is set forth. In step 810, the application at the second screen device is initiated. The application startup is in communication with the application system web service module 110 illustrated in FIG. 2. The application system web service in step 812 may return an XML document that contains a location identifier or site identifier, host uniform research locators and application settings. In step 814, the login state for the user is presented to the second screen device. In step 816, the user of the second screen device is prompted for security details such as a user identifier, password or the like. In step 818, the authorization web service retrieves the stored user information and compares that to the entered security information in step 818. If authorization is not performed in step 820, the user may be prompted for further details in step 816.

After step 820, step 822 obtains background data for the second screen device. The background data requests may be queued. The background data may be requested from the application system web service. The application web system service may call the program guide web service receivers in step 826. Simple listings may be provided in step 828 from the program guide web service. The results may be communicated in a format such as XML format. Simple listings may be obtained for the first 1.5 hours of guide data so that an initial vision of the guide data is obtained. After the initial guide data is obtained, further guide listings may be obtained. For example, the next hour may be requested after the first hour and a half of guide listings are requested. Stepped results may be obtained to allow a usable group of data to be obtained quickly. Step 830 may be performed only after step 828 is completed. In step 832, a homepage may be displayed on the user device. The homepage may be configured with the data requested in steps 826-830.

Figure 9:
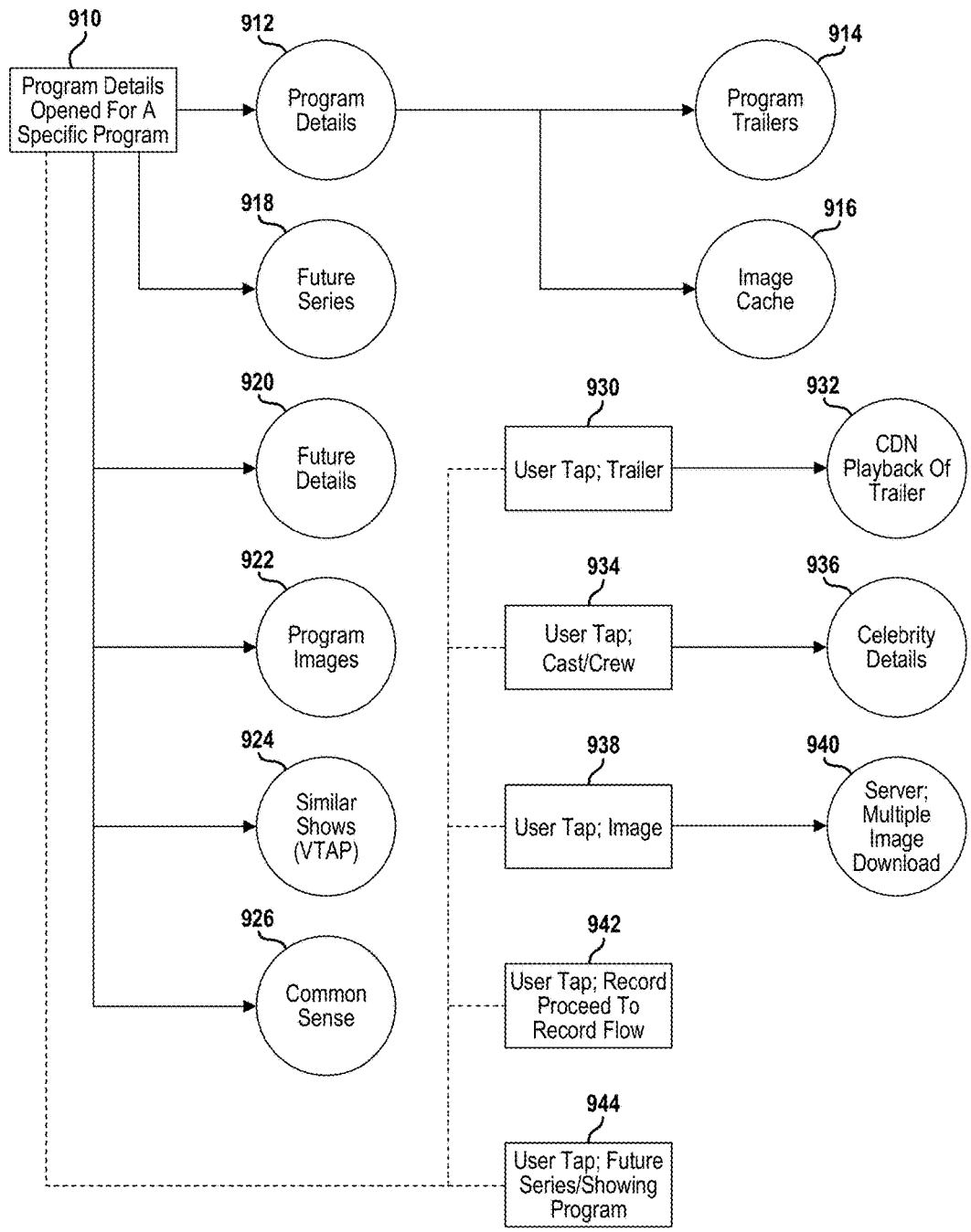
FIG. 9 is a flowchart of a method for obtaining program details.

Referring now to FIG. 9, data on the second screen may be selected by touching the data on a touch screen or other means for selection through a user interface. By selecting specific data, program details for a specific program may be obtained in step 910. The program guide web service may be used to obtain program details in step 910. Program details may include program trailers in step 914 and an image cache with various images in step 916.

After step 910, if a future series is selected, step 918 is performed. Step 918 obtains future series data from the program guide web service.

In step 910, if a future schedule is selected, future schedule data may be obtained in step 920 from the program guide web service. In step 910, if the program images are selected, step 922 obtains the program images from the program guide web service. In step 924, if a similar show selection has been selected, step 924 obtains similar show data from the program guide web service. The similar show data may be obtained from various sources. In step 926, common sense data which is parental data such as ratings, graphics related to ratings, descriptions of ratings and a ratings mirror may be obtained when program details are selected in step 910.

Various other selections may be made by the user tapping the touch screen or by other types of user interfaces. For example, when trailers are selected in step 930, the content delivery network may initiate the playback of a trailer in step 932. In step 934, if the cast and crew are selected, celebrity details may be obtained from the program guide web service in step 936. If an image is selected in step 938, step 940 may obtain multiple image downloads from the program guide web service or other data source.

In step 942, a program may be selected to record.

In step 944, a future series or the program currently showing through the set top box may be selected for displaying related content.

Figure 10:
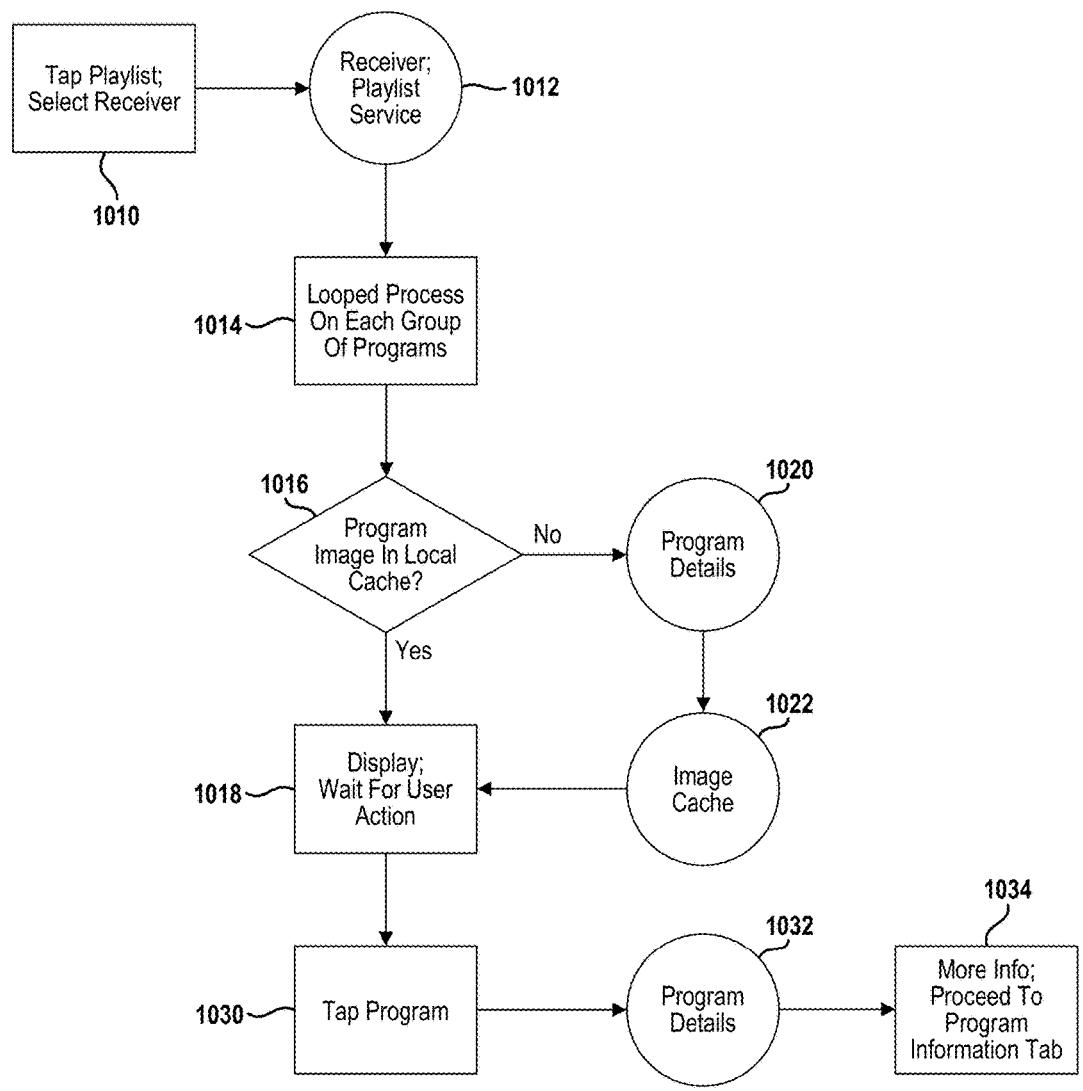
FIG. 10 is a flowchart of a method for obtaining playlist data from a set top box.

Referring now to FIG. 10, obtaining data from the set top box playlist may be performed. Playlist data may be formed by selecting a playlist button on the screen display associated with the second screen device in step 1010. In step 1012, the playlist service is initiated at the set top box from the second screen device. In step 1014, a process is looped and programs from each are grouped. In step 1016, when the program images are stored within the set top box, step 1018 waits for user action to display the content. In step 1016, if the program image is not in the local cache, step 1020 obtains the program details from the program guide web service. In step 1022, the image cache is obtained from the program guide web service. After step 1022, step 1018 is also performed. In step 1030, if the program content is tapped or selected from the playlist, step 1032 obtains the program details from the program guide web service. In step 1034, if more information is tapped or selected at the second screen device, further program information is obtained.

Figure 11:
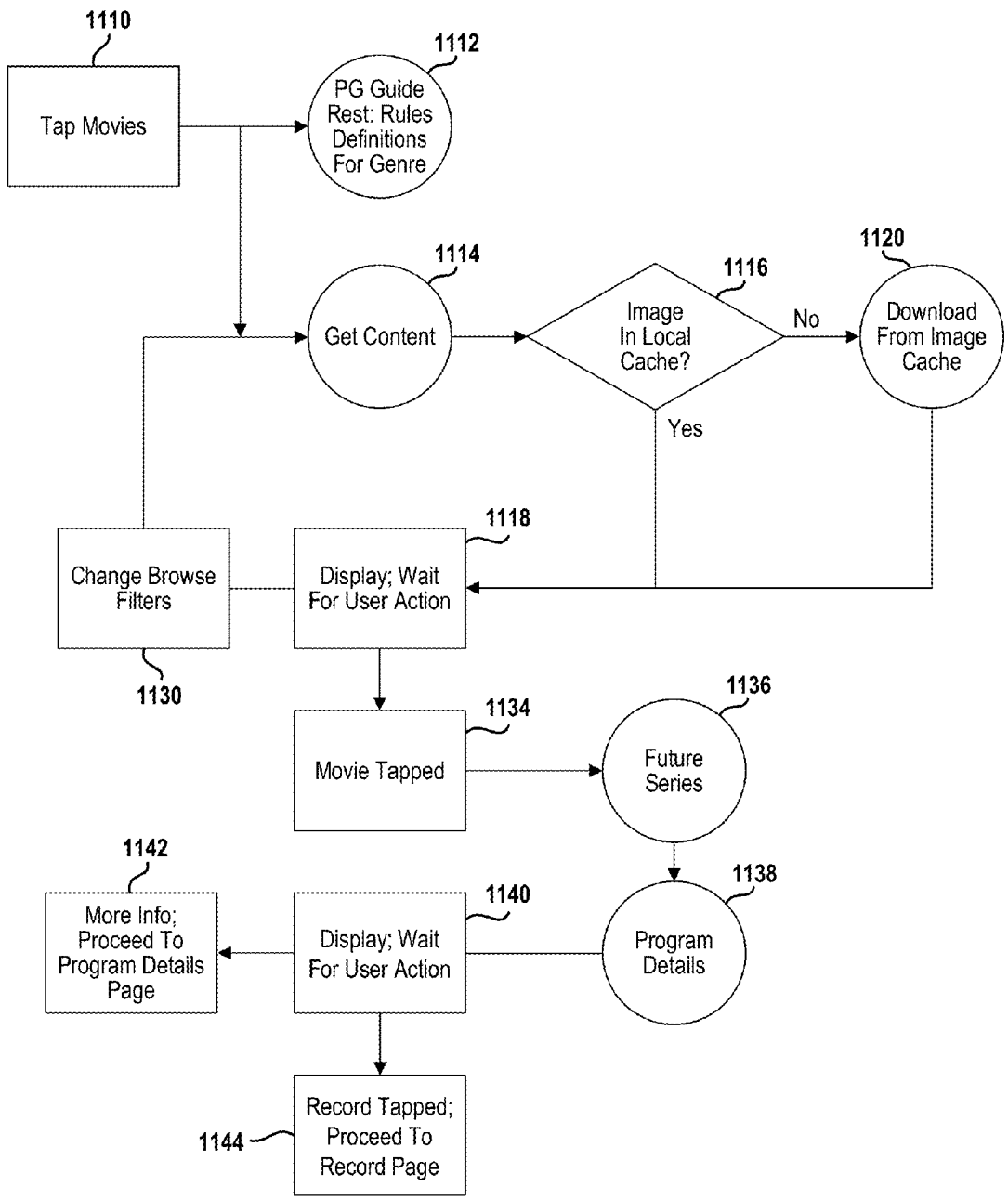
FIG. 11 is a flowchart of a method for obtaining movies or a movie list from the set top box.

Referring now to FIG. 11, when a movies page is selected at the second screen, a movies button on the touch screen may have been selected in step 1110 to obtain the movies page. In step 1112, the program guide system may obtain a predetermined number of records when searching for different movies. The rules for different genres may be established in step 1112. In step 1114, content may be obtained from the program guide system. If the image is in a local cache in step 1116, step 1118 waits for user action to display the image. In step 1116, if the image is not in the local cache, step 1120 obtains the image from a program guide source or other source.

Step 1130 allows various browsing filters to be changed by the user. The browsing filters may be changed for personal interest in movies. The filters may be changed at various times by the user so that desired movies may be obtained. For example, should the user desire romantic films, comedy films, westerns, or the like the user selections may be set so that the filters obtain the desired content. The filters may also filter for ratings so that family movies may be obtained in the list. Adult films may thus be excluded by the filters. Rated R films and higher may also be excluded depending on the filter terms.

In step 1134, when a movie is tapped, future series data may be obtained in step 1136. The future series data may be obtained from the program guide system. In step 1138, program details for the particular movie may also be selected. In step 1140, the display may be displayed until another action is desired through the user interface or touch screen. In step 1142, program details page may be obtained by selecting a program or program details selection on a screen display in step 1140.

In step 1140, if a record button is selected, step 1144 proceeds to a recording page. A recording page may be displayed on the screen display so that recording may be performed.

Figure 12:
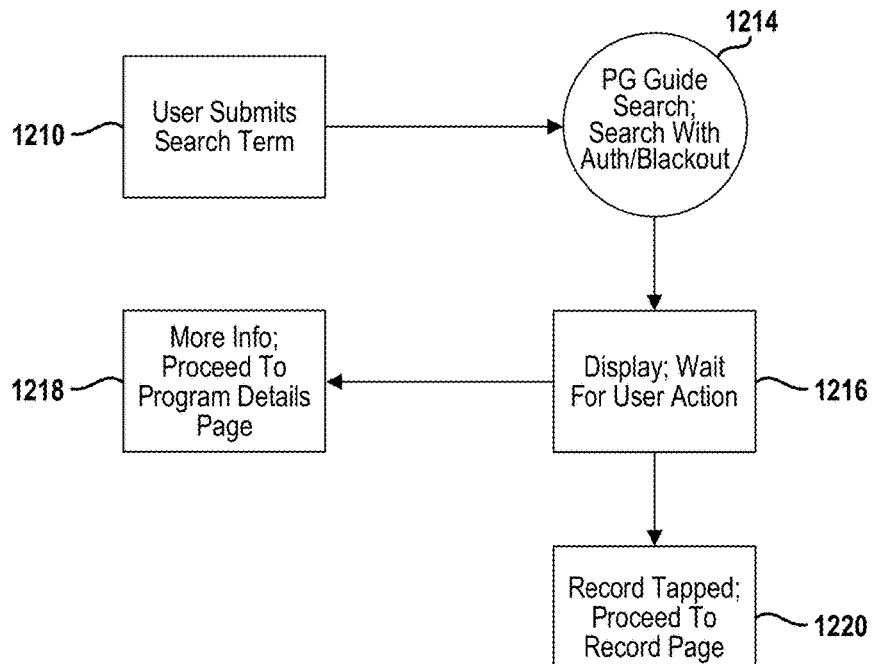
FIG. 12 is a flowchart of a method for performing a search.

Referring now to FIG. 12, searching may also be performed on the second screen device. In step 1210, if the user submits a search term, a program guide search may be performed in step 1214. Blackouts and authorizations may also be included within the search terms so that only authorized programs corresponding to the subscription service and non-blacked-out programs may be obtained. After step 1214, step 1216 waits for user action. If the user selects program details, program details may be obtained in step 1218. In step 1216, if the program is desired to be recorded, step 1220 may be performed.

Figure 13:
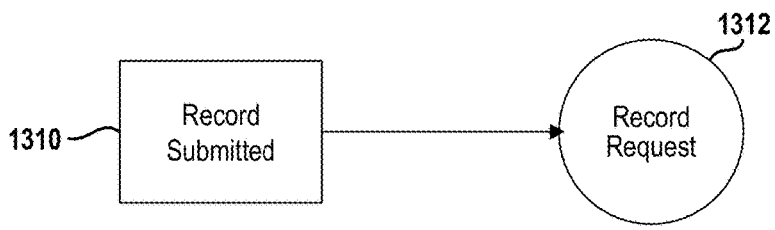
FIG. 13 is a flowchart of a method for recording a program.

Referring now to FIG. 13, to perform a recording step 1310 may be selected. In step 1310, a recording may be submitted to the program guide web service 1312. The program guide service may generate the recording request and communicate the recording request to a subscription service so that a conditional access packet may be provided to the set top box. This may be performed when the second screen device is not directly adjacent to the set top box or within the same local area network. The recording may also be performed through the local area network when the user is proximate the set top box.

Figure 14:
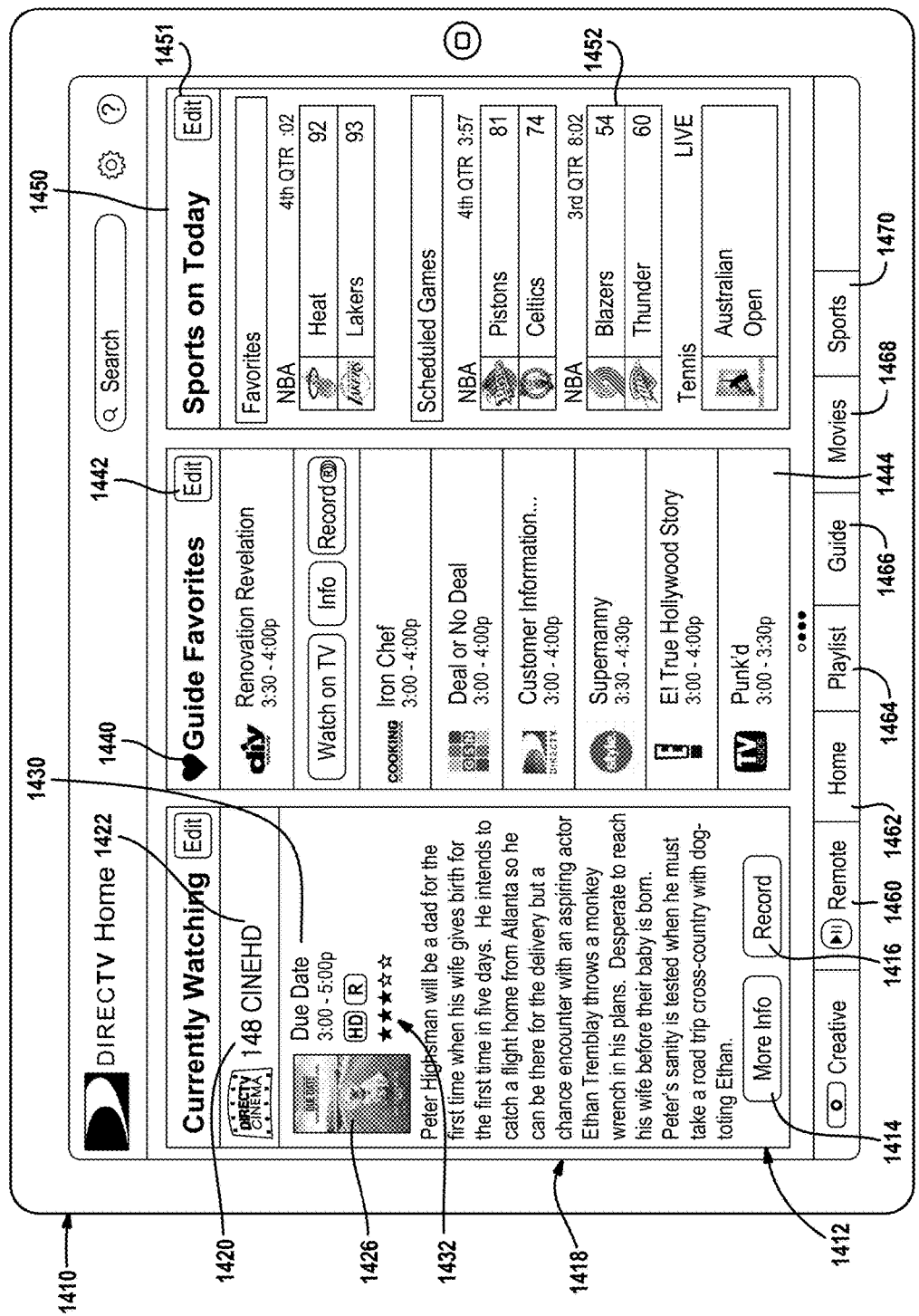
FIG. 14 is a screen display of a homepage of a second screen device application on the second screen device.

Referring now to FIG. 14, a screen display 1410 is illustrated having various modules displayed thereon. The screen display 1410 displays a homepage for DIRECTV® service referred to as DIRECTV® Home. As mentioned above, various modules may be displayed at any one time. A Currently Watching module 1412 is displayed as mentioned above the set top box identifies to the second screen device the program currently being watched. The program being watched may be a linear broadcast or programs recorded on the set top box. An information button 1414 and a record button 1416 may also be displayed along with data in a data portion 1418. The more information button may be selected to obtain more information regarding the program currently being watched. The record button 1416 may initiate a recording sequence for scheduling recording of the current program. Other data that may be displayed are the channel number 1420, the channel name 1422, and an image 1426 corresponding to the current program. A title and time section 1430 may also be used. A ratings indicator may also be displayed.

Another module is a guide listing module. In the present example, the guide listing module is displaying guide favorites (favorite channel listings). The guide favorites may be user-selected using the edit button 1442. The edit button may be used to select the favorite channels. The edit buttons may also be used to select the favorite programs, or pre-canned lists like news, programs and children's programs. In this embodiment, guide favorites are displayed for a predetermined channel in a channel module box 1444. When a channel module box is selected using the user interface such as the touch screen, further information and details about the particular channel or program may be displayed within the guide listing box 1440. Recording options may also be provided when further details is displayed.

Another module is a sports module 1450. The sports module 1450 may be configured in various manners according to user selections by using the edit box 1451. The sports module 1450 may generate sports scores for current events as well as listings for future events. By selecting any one of the sports boxes 1452, further information may be obtained by the second screen device. A recording box may also be provided after further information is displayed. The sports module 1450 may have scores updated after a predetermined amount of time. For example, the sports may be updated every 45 seconds. Of course, only sports scores with a start time of the current day are updated.

A plurality of tabs 1460-1470 may be provided at the bottom of the screen display of the second screen device. A remote tab 1460 may be selected for a touch screen remote control to be displayed on the display. A home tab 1462 may be selected to display the homepage with the user's selection of modules. Default settings may be provided for first-time users. The screen display 1410 illustrates the home selection. The playlist tab 1464 displays the playlist of the digital video recorder within the set top box. The playlist is a compilation of all of the content recorded on the set top box. Some of these functions will be described further below.

Figure 15:
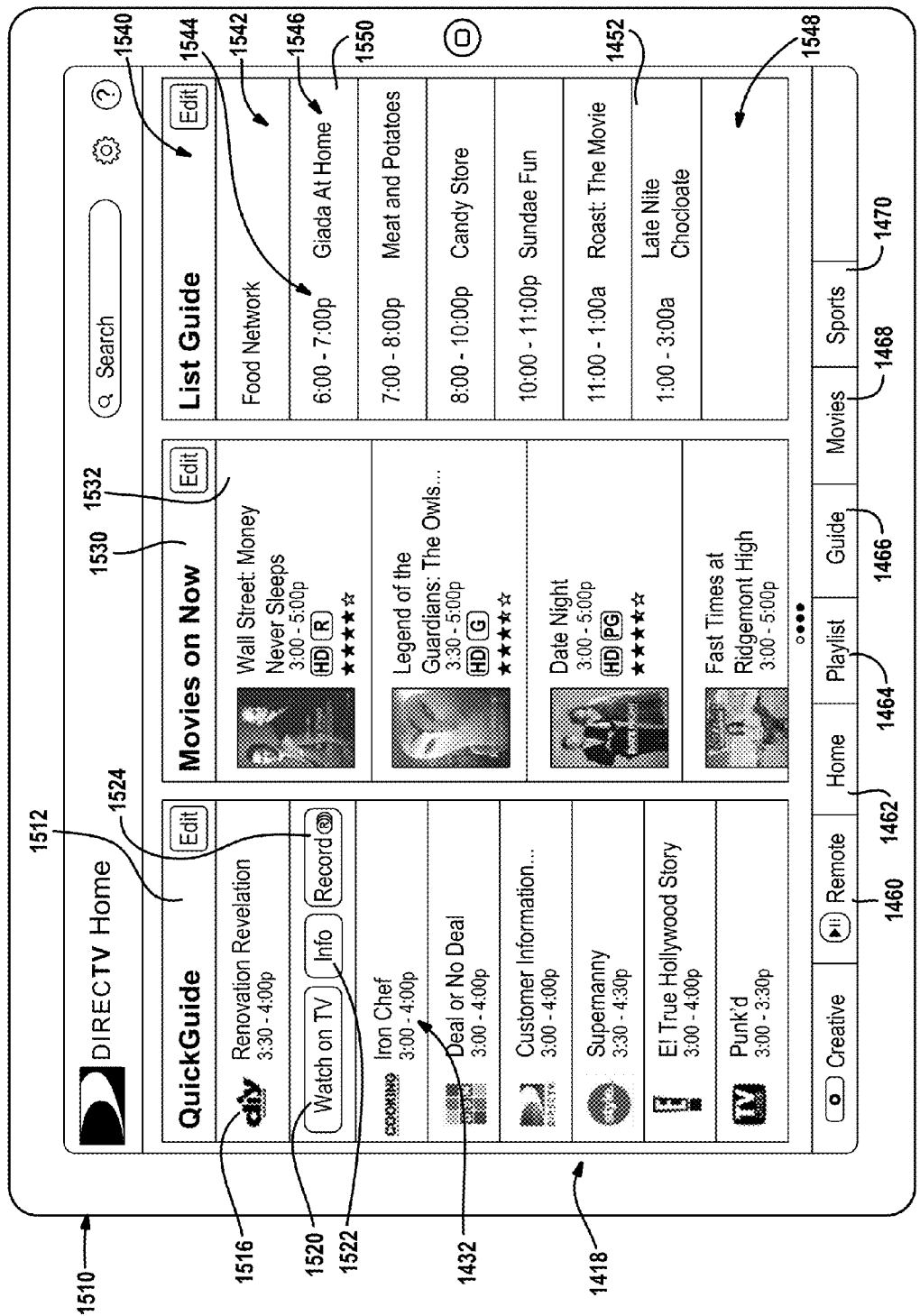
FIG. 15 is a screen display of an alternative home screen of a second screen application on the second screen device.

Referring now to FIG. 15, an alternate screen display 1510 is illustrated. In this screen display, a quick guide module 1412 is illustrated. The quick guide module may display favorite television shows for a particular time period. The quick guide module may also show favorite channels over a particular time period. An option box 1514 may be displayed by selecting one of a plurality of program boxes 1516. By selecting the program box 1516, the option box 1514 is displayed having a Watch On TV button 1520, an information button 1522, and a record button 1524. The Watch On TV button 1520 will initiate the sending of a control signal to the set top box so that the set top box tunes to the particular channel and program. The information button 1522, when selected, provides further information regarding the selected program. The record button 1524 records the selected program. Another type of module is a Movies On Now module 1530. The Movies on Now module may provide the user a list of movies that are currently showing on various channels. The Movies on Now button may be subject to subscription restrictions. That is, the Movies on Now button may be used to display movies that are only available for the subscription packages subscribed to by the user. A plurality of movie boxes 1532 are illustrated with a movie poster, titles, a time, a high-definition or standard-definition indicator, a motion picture association rating, and a user "star" rating.

The screen display 1510 may include a list guide module 1540. The list guide module may provide a list for a predetermined network 1542. The predetermined network may be user-selectable. The list guide provides times 1544 and titles 1546 for the programming of a particular network. In this example, the programs for the next nine hours of programming are illustrated on the screen display. Further programs in the future may be provided by selecting the arrow 1548. By selecting one of the program boxes 1550, an options menu may be displayed in a similar manner to that illustrated in the quick guide module 1512.

Figure 16:
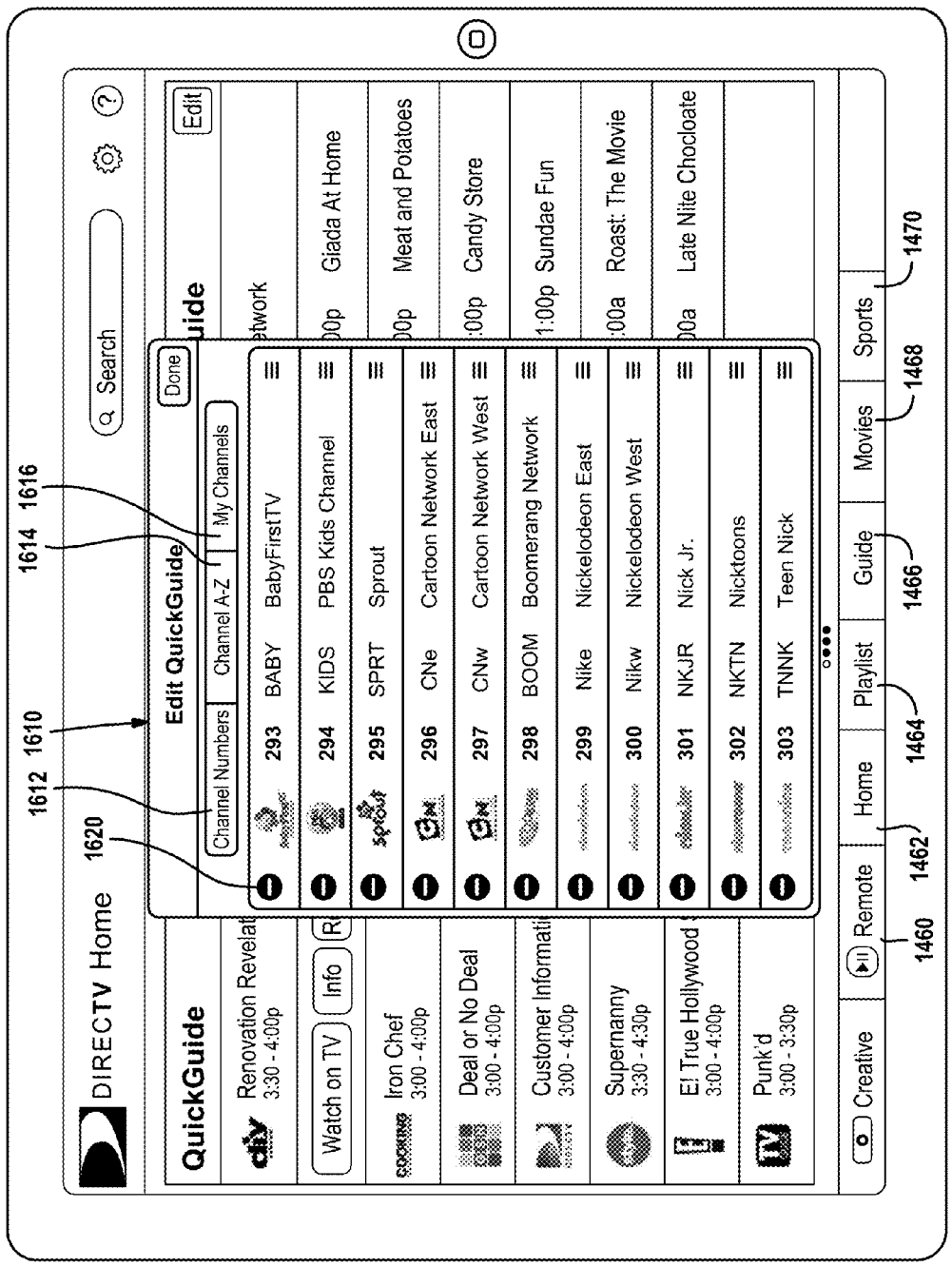
FIG. 16 is a screen display for editing a quick guide channel list on the second screen device.

Referring now to FIG. 16, a quick guide editing box 1610 is illustrated and used for editing the selections in the quick guide module 1512 illustrated in FIG. 15. In this example, the available channels may be selected by selecting a channel number button 1612, an alphabetical button 1614, and a my channel button 1616. By selecting a selector button 1620 in the column of channel buttons, the channel may be added to the list of channel data from the quick guide or displayed on the quick guide. The channels may be displayed in channel number order by selecting the button 1612, by alphabetical order by selecting the button 1614, or by selecting a customizable list of "my channels" that is selectable by the users from button 1616.

Figure 17:
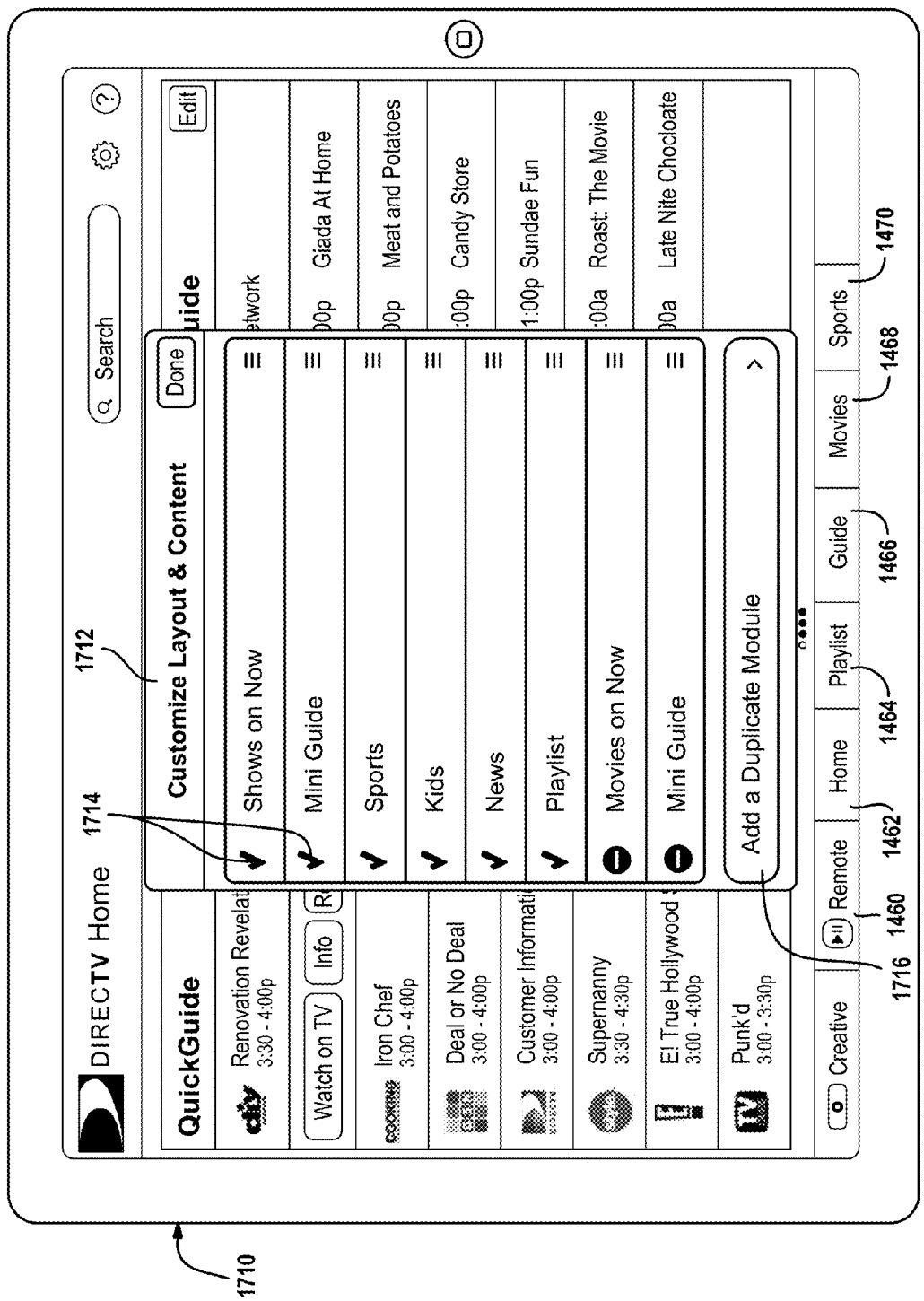
FIG. 17 is a screen display for customizing the layout of the homepage on the second screen device.

Referring now to FIG. 17, a screen display 1710 illustrating a customization box 1712 is set forth. The customization box 1712 includes a plurality of user-selectable modules thereon. Selection indicators 1714 provide visual feedback as to the module(s) selected or not selected. Duplicate modules may also be selected by selecting the duplicate module selection 1716 at the bottom of the customization box 1712.

Figure 18:
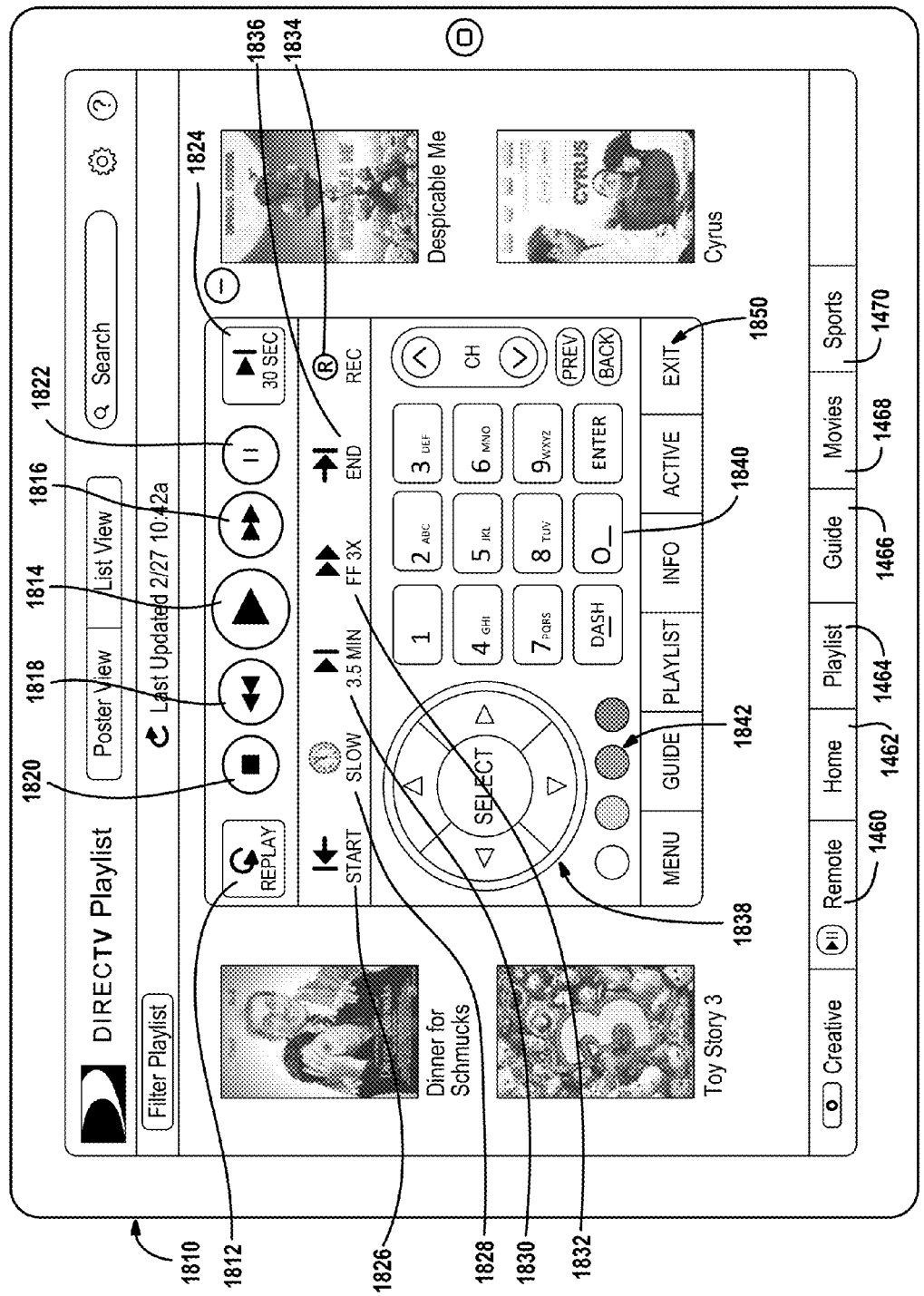
FIG. 18 is a screen display of a remote control device on the second screen device.

Referring now to FIG. 18, a screen display 1810 illustrating DVR control box 1812 is illustrated. The screen display 1810 acts as a remote control screen interface. This screen may be reached from the playlist tab 1464. One of the movie posters or movies in a list may be selected from the playlist. The control box 1812 may then be displayed in response thereto. Various touch screen buttons may be displayed on the control screen including a play button 1814, a fast forward button 1816, a reverse button 1818, a stop button 1820, a pause button 1822, a forward 30-second button 1824, a start button 1826 which rewinds to the start of the movie, a slow button 1828 which slows the playback of the content, a forward 2.5-minute button 1830, a forward three times the speed button 1832, a forward-to-the-end button 1834, a record button 1836, arrow buttons 1838 used for making selections, a numerical keypad 1840, color shortcut buttons 1842, and various other selections in a selection row 1850 are set forth. The selection row may include a menu tab, a guide tab, a playlist tab, an information tab, an active tab, and an exit tab. Thus, functions corresponding to the remote and enhanced functions may be provided on the second screen device. By selecting a touch screen button, a button signal is generated and communicated to the set top box to control the set top box according to the function of the touched or selected button.

Figure 19:
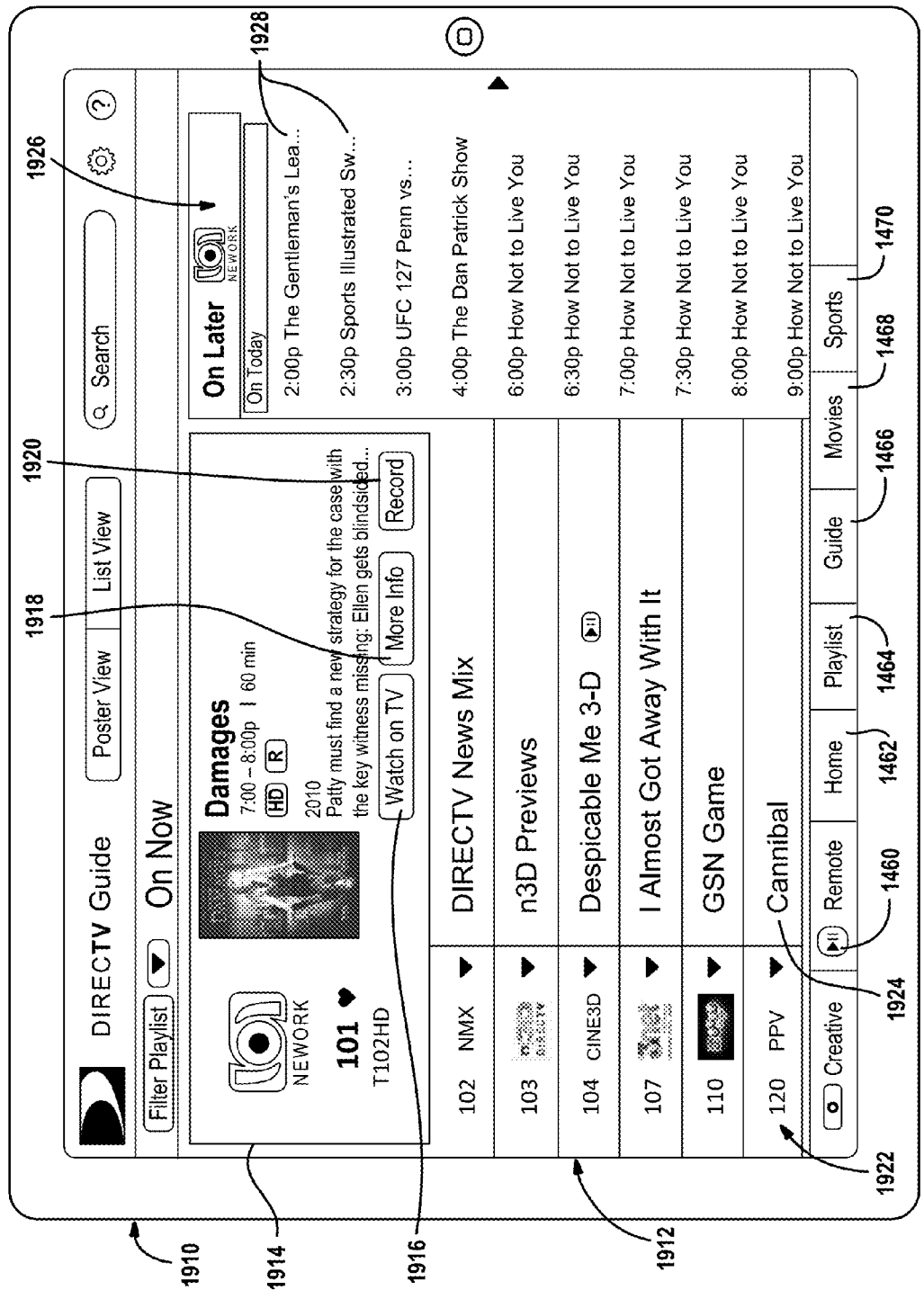
FIG. 19 is a screen display for displaying guide data on the second screen device.

Referring now to FIG. 19, a screen display 1910 corresponding to the guide tab 1466 is set forth. The screen display 1910 may provide different displays thereon. The first display illustrated in FIG. 19 is an On Now display 1912. The On Now display 1912 gives a listing of channels and the programming that is currently available. A selection box 1914 for channel 101 is set forth. By selecting a channel using the user interface of the second screen device, content data may be provided. In this example, the network name, the title of the content, a brief description, the time and the length may be set forth. Selection buttons such as a Watch On TV button 1916 may be selected for directly tuning the tuner of the set top box to the particular channel. A more information button 1918 may be selected for retrieving further information about the content on the particular selected channel. Button 1920 allows the user to initiate a recording event at the second screen device so that the set top box is controlled to record the particular program on the selected channel. The On Now display 1912 illustrates channels 1922, which may also include a logo. A title of the program is also provided in the title portion 1924. An On Later display 1926 may also be provided. The On Later display 1926 provides content that is on later in time for the channel selected from the selection box 1914. In this example, a sequential list of times and titles is provided in the content boxes 1928.

Figure 20:
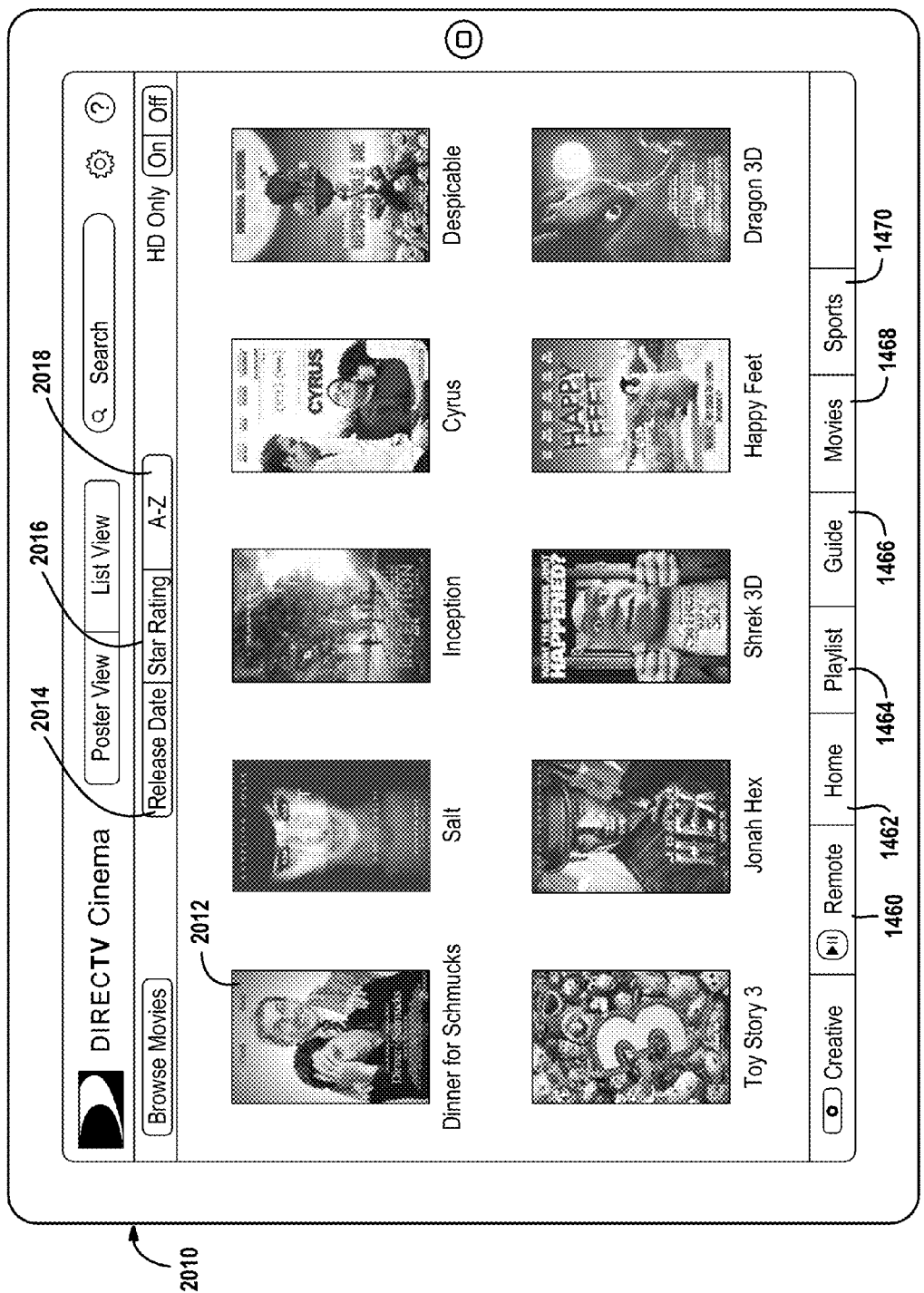
FIG. 20 is a screen display of the second screen device when the movies tab has been selected.

Referring now to FIG. 20, a screen display 2010 is illustrated when the movies tab 1468 is selected. In this example, the movies tab illustrates the movies that are available through "DIRECTV Cinema." DIRECTV Cinema is a system that allows ordering of on-demand movies as well as a selection of preloaded movies on a set top box. In the present example, posters 2012 are provided for various movie titles. The posters are user-selectable using the user interface of the second screen device. When a poster is selected, a selection signal is communicated to the set top box. The set top box in turn plays back the content from the digital video recorder or requests the content from a content processing system. Although posters 2012 are illustrated, other types of displays may be provided. A selection block 2014 may be used to display the titles by release date. A selection box 2016 may be used to select or to display the titles in order of star rating. The star rating may be provided by subscribers of the service. A selection box 2018 may be used to display the cinema titles in alphabetical order.

Figure 21:
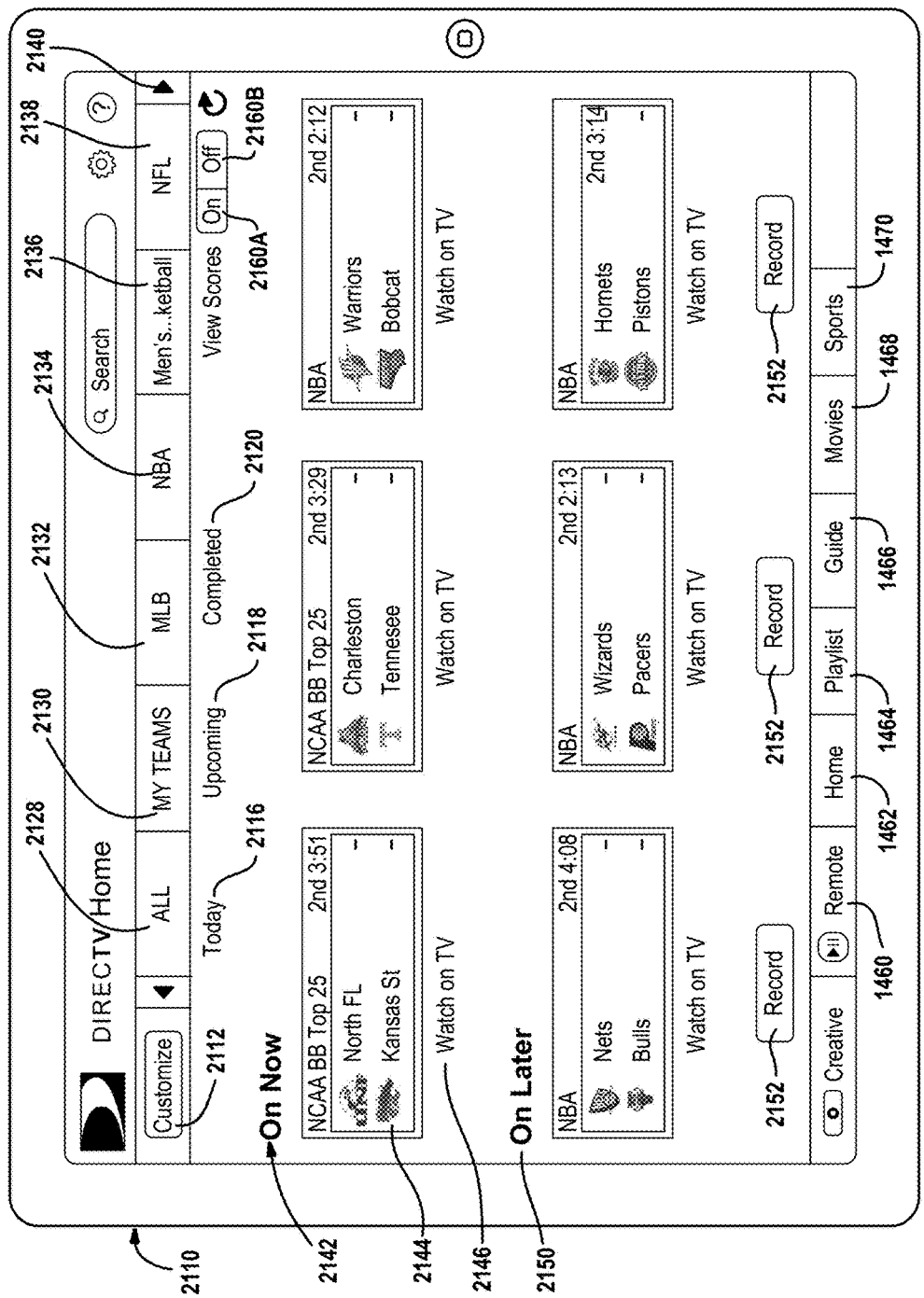
FIG. 21 is a screen display when the sports tab is selected.

Referring now to FIG. 21, a screen display 2110 is illustrated after selecting the sports tab 1470 from FIG. 14. In this example, the screen display 2110 is a sports screen display that has a plurality of selection boxes. In this example, a customized button 2112 illustrates that customization is available for the screen display. This will be further described in FIG. 22. The sports display 2110 may be used to display all sports scores, all selection box 2114. The all sports selection box 2128 may be used to display today's sporting events by selecting the today box 2116, upcoming sporting events by selecting the upcoming selection box 2118 or completed games by selecting the completed box 2120. Further, a My Teams tab 2130 may be used to select only the teams of interest to the particular user.

Various leagues may also be selected by using the leagues selection boxes 2132-2138. In this example, a Major League Baseball selection box 2132, an National Basketball Association selection box 2134, a men's college basketball selection box, 2136, and an National Football League selection box 2138 are selected. An arrow selector 2140 may be used to select different networks.

The screen display 2110 may also be selectable in a vertical position. In this screen display 2110, an on-now portion 2142 illustrates the games that are currently on in a sports score selection and display box 2144. A Watch On TV box 2146 may be selected by a user interface of the second screen device so that the set top box is tuned to the particular sporting event. The sports score selection and display box 2144 may also be selected so that further details are provided regarding the particular game. By way of example, various scoring opportunities may be displayed when further information is requested.

An On Later portion 2150 of the screen display may also indicate the games or sporting events available at a later time. In this case, a record button 2152 may be selected so that the set top box may record the sporting event.

A score toggle button 2160 is displayed on the screen display 2110. The sports toggle button 2160 is used for hiding the sports scores. In this example, the sports scores are toggled off so that the sports scores of current games or sporting events are not displayed. This prevents the outcome from being spoiled for the user. If the sports scores are available, the toggle button 2160A is selected to be on. In this example, sports toggle button or sports off button 2160B is selected.

Figure 22:
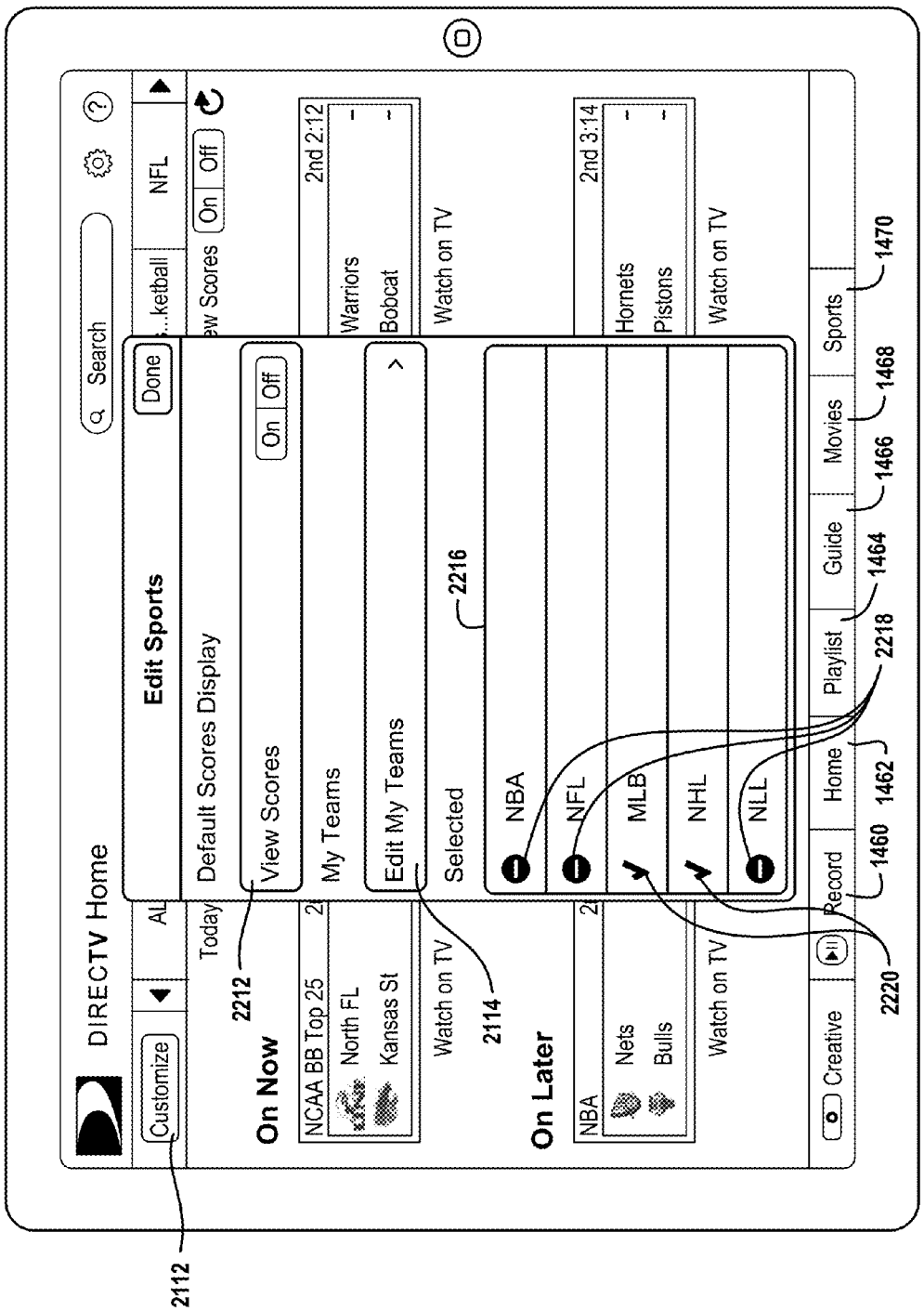
FIG. 22 is a screen display of a control box for editing the sports screen display.

Referring now to FIG. 22, a control box 2210 may be displayed after the customized button 2112 of FIG. 21 is selected. In this example, the control box 2210 may be used to change the default scores in a similar manner to box 2160 of FIG. 1. By selecting on or off, the view score selection portion 2212 the sports scores may be displayed or concealed.

Button 2214, the my teams portion may be edited. By selecting screen display button 2214, the sports teams desired to be viewed by the user may be changed.

In the "selected" portion 2216, the various leagues having gains may be selected. Indicators 2218 indicate that the particular league has not been selected. Indicators 2220 indicate the particular league has been selected.

Figure 23:
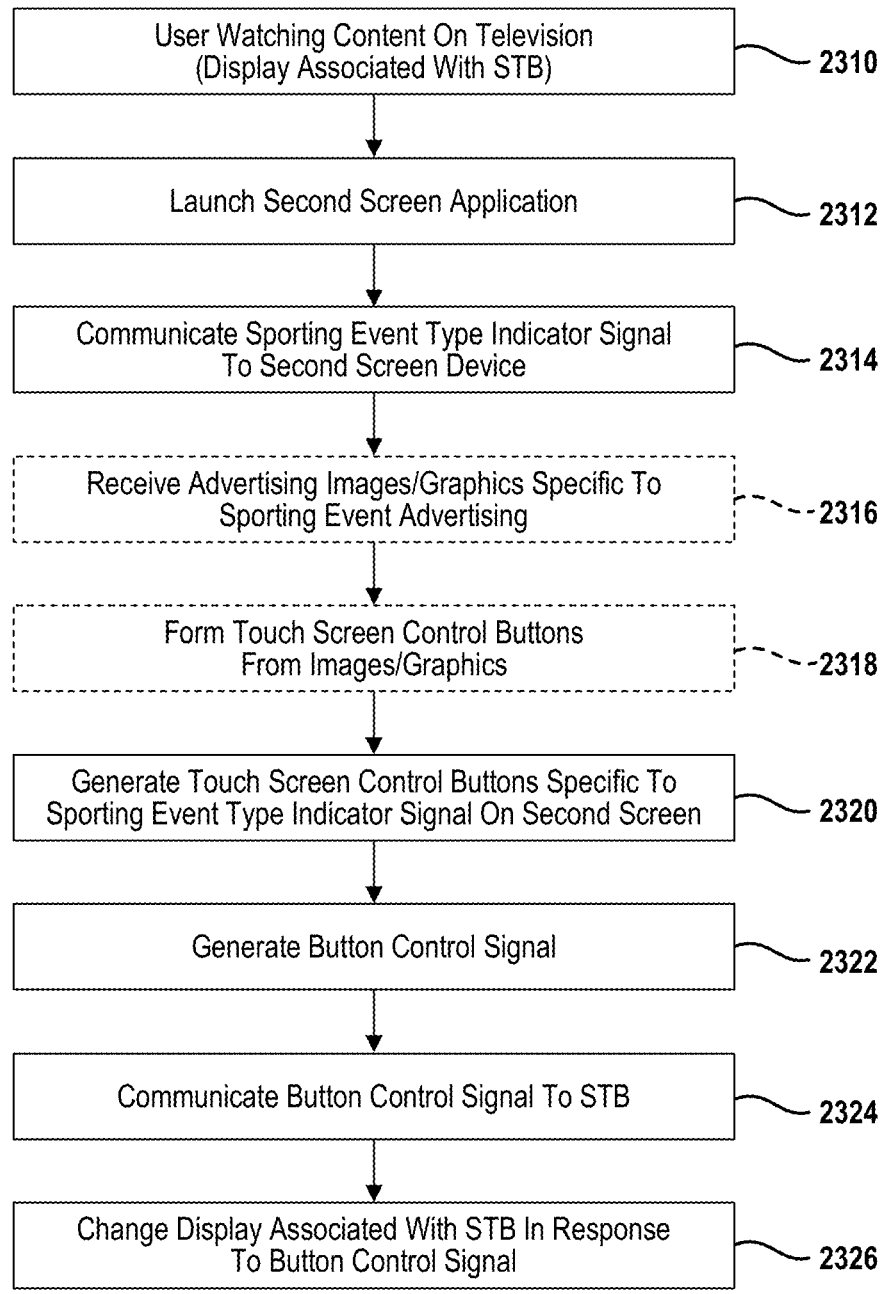
FIG. 23 is a flowchart of a method for generating an event-specific remote control on the second screen device.

Referring now to FIG. 23, a method for providing a sports remote control is set forth. As described earlier, the second screen device may be used for controlling the set top box associated therewith. However, while watching a particular type of event, such as a sporting event, the remote control displayed may be different. In step 2310, the user is watching content on the set top box associated with the television. The content, in this example, is being provided from a memory device such as the digital video recorder. In step 2312, the second screen application is launched on the second screen device. As mentioned above, the launching of the second screen application may take place using various authorizations, passwords, or other types of security. In step 2314, a program event type identifier signal is communicated to the second screen device. In this example, a sporting event type identifier signal is communicated to the second screen device to indicate that a sporting event is being displayed through the set top box. The content identifier includes the event type identifier that identifies the type of event. Certain identifiers may correspond to a sporting event or a specific type of sporting event In step 2316, an optional step of receiving advertising images or graphics specific to the sporting event being broadcasted is performed. That is, special images corresponding to the sporting event or general advertising images may be received by the second screen device. These images may be received directly through a network connection from the set top box or the content processing system. In step 2318, a touch screen control panel corresponding to a remote control may be generated. The touch screen control may have images corresponding to the advertising images utilized as some or all of the buttons. Step 2318 is also an optional step.

In step 2320, the touch screen control buttons are generated specific to the sporting event type indicator. Thus, a plurality of event-specific user interface controls are displayed on the second screen device. In step 2322, a user selects one of the touch screen buttons and generates a button control signal. The button control signal may be communicated to the set top box through a local area network using a suitable protocol such as HTTP in step 2324. Step 2326 changes the display associated with the set top box in response to the button control signal. As will be described below, the set top box may be controlled in an event-specific manner.

Referring now to FIG. 24, one example of a screen display for a remote control screen display 2410 is set forth. In this example, a play button 2412 and a pause button 2414 are set forth. Other display buttons and display areas are set forth. These may be user-selectable or used for advertisements. Button 2416 may bring up a list of available sports events by sports. These may be both live and recorded events, just recorded events or just live events. In this example, a basketball logo 2418 is used to illustrate that basketball events have been selected. A user-selectable area 2420 corresponding to a favorite logo may be set by the user. A logo area 2422 may be selectable from a list of logos for various teams. Button 2430 is an event-specific button corresponding to skipping a timeout period of a basketball game. Button 2432 is a skip free throw button that skips the playback of free throw. A skip defense button 2434 skips defense of a team. The button may skip forward 24 seconds in this example. A slow-motion button 2436 may also be provided. The slow-motion button slows the playback. Button 2438 corresponds to a rewind three seconds. The rewind button may be configurable by the user or may change based upon the sport.

Another button 2440 may be used to launch a video or linked to a retailer's website. In this example, an image 2446 may be provided by an advertiser.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:
1. A method comprising:
displaying content on a display associated with a set top box;
generating a content information request signal at a second screen device requesting data corresponding to the content;
communicating the content information request signal to the set top box;
communicating a content information signal to the second screen device from the set top box comprising a sporting event identifier corresponding to sporting event type;
generating, at the second device screen a request for statistics for a current event based on the sporting event identifier and for statistics for related events based on the sporting event identifier;
communicating the request for statistics and related events from the second screen device;
obtaining social commentary from a social media source based on the sporting event identifier;
aggregating statistics corresponding to the sporting event and related event from a data services center and social commentary from the social media source to form an aggregated related content data signal;
communicating the aggregated related content data signal to the second screen device; and displaying the aggregated related content data at the second screen device comprising sporting event statistics, related sporting event statistics and the social commentary.

2. A method as recited in claim 1 wherein displaying content comprises displaying content stored with a digital video recorder of the set top box.

3. A method as recited in claim 1 wherein displaying content comprises displaying content in real time from a set top box tuner.

4. A method as recited in claim 1 wherein displaying content comprises displaying content in real time from a satellite tuner in a set top box.

5. A method as recited in claim 1 wherein generating a content information request signal at a second screen device comprises generating the request for content data signal at a mobile device.

6. A method as recited in claim 1 wherein generating a content information request signal at a second screen device comprises generating the request for content data signal at a touch screen device.

7. A method as recited in claim 1 wherein communicating a content information request signal comprises communicating the content information request signal through a local area network.

8. A method as recited in claim 1 wherein communicating a content information request signal comprises communicating the content information request signal through a local area network and a router associated with the local area network.

9. A method as recited in claim 1 wherein communicating a content information request signal comprises communicating the content information request signal using hyper-text transfer protocol (HTTP) from the second screen device to an HTTP engine of the set top box through a local area network.

10. A method as recited in claim 1 wherein communicating a content information signal comprises communicating the content information signal comprising a channel identifier.

11. A method as recited in claim 1 wherein communicating a content information signal comprises communicating the content information signal comprising the sporting event identifier comprising a sporting event name.

12. A method as recited in claim 1 wherein communicating a content information signal comprises communicating the content information signal through a local area network.

13. A method as recited in claim 1 wherein communicating a content information signal comprises communicating the content information signal using hyper-text transfer protocol (HTTP) from an HTTP engine of the set top box through a local area network to the set top box.

14. A method as recited in claim 1 wherein communicating the request for statistics comprises communicating the request for statistics through a local area network and a router associated with the local area network to a data center.

15. A method as recited in claim 1 wherein aggregating statistics comprises aggregating statistics at a data services center from a plurality of data sources.

16. A method as recited in claim 1 further comprising displaying a plurality of user-selectable modules at the second screen device.

17. A method as recited in claim 16 wherein displaying a plurality of user-selectable modules comprises displaying a currently watching module that displays at least a portion of the aggregated related content data corresponding to the content.

18. A method as recited in claim 16 wherein displaying a plurality of user-selectable modules comprises displaying a guide listing module that displays channel listings for a predetermined time.

19. A method as recited in claim 16 wherein displaying a plurality of user-selectable modules comprises displaying a channel listing module that displays channel listings for a user-selected channel.

20. A method as recited in claim 16 wherein displaying a plurality of user-selectable modules comprises displaying a sports module that simultaneously displays sports events listings and the statistics.

21. A method as recited in claim 16 wherein displaying a plurality of user-selectable modules comprises simultaneously displaying a sports module displaying statistics and a Currently Watching module.

22. A method as recited in claim 16 wherein displaying a plurality of user-selectable modules comprises displaying a sports module that displays sporting events and the statistics for the current event and related events and further comprising displaying a score toggle button on the second screen device for selectably displaying and not displaying the statistics.

23. A method as recited in claim 1 further comprising displaying a remote control user interface having a touch screen button on the second screen device.

24. A method as recited in claim 23 further comprising selecting the touch screen button displayed on the second screen device, generating a button signal corresponding to the touch screen button, and communicating the button signal to the set top box.

25. A method as recited in claim 23 further comprising selecting the touch screen button, generating a button signal corresponding to the touch screen button, and communicating the button signal to the set top box through a local area network.

26. A method as recited in claim 23 further comprising selecting the touch screen button, generating a button signal using hypertext transfer protocol corresponding to the touch screen button, and communicating the button signal to the set top box through a local area network and a router.

27. A method as recited in claim 26 further comprising receiving advertising data at the second screen device and displaying the advertisement data within a touch screen button.

28. A system comprising:
a set top box displaying content on a display associated therewith; and
a second screen device generating a content information request signal requesting data corresponding to the content, communicating the content information request signal to the set top box;
said set top box communicating a content information signal to the second screen device comprising a sporting event identifier corresponding to sporting event type;
said second screen device generating a request for statistics for a current event and for statistics for related events based on the sporting event identifier, communicating the request for statistics and related events through a network, receiving social commentary from a social media source based on the sporting event identifier aggregating statistics corresponding to the sporting event and related event from a data services center and social commentary from the social media source and displaying the aggregated statistics comprising sporting event statistics and related sporting event statistics.

29. A system as recited in claim 28 wherein the set top box comprises a digital video recorder storing the content therein.

30. A system as recited in claim 28 wherein the set top box displays content in real time from a set top box tuner.

31. A system as recited in claim 28 wherein the second screen device comprises a mobile touch screen device.

32. A system as recited in claim 28 wherein the set top box communicates the content information request signal through a local area network having a router.

33. A system as recited in claim 28 wherein the content information signal comprises a channel identifier.

34. A system as recited in claim 28 wherein the content information signal comprises a content name.

35. A system as recited in claim 28 further comprising a data services center in communication with the second screen device aggregating related content data from a plurality of data sources.

36. A system as recited in claim 35 wherein aggregated related content data comprises at least one of pictures, trivia data, actor data and scores.

37. A system as recited in claim 35 wherein aggregated related content data comprises data related to an actor associated with the content or title of the content.

38. A system as recited in claim 28 wherein the display displays a plurality of user-selectable modules.

39. A system as recited in claim 38 wherein the display displays a currently watching module that displays at least a portion of the aggregated statistics relating to the content.

40. A system as recited in claim 38 wherein the plurality of user-selectable modules comprises a guide listing module that displays channel listings for a predetermined time.

41. A system as recited in claim 38 wherein the plurality of user-selectable modules comprises a channel listing module that displays channel listings for a user-selected channel.

42. A system as recited in claim 38 wherein the plurality of user-selectable modules comprises a sports module that simultaneously displays sports events listings and the statistics.

43. A system as recited in claim 38 wherein the plurality of user-selectable modules comprises a sports module simultaneously displaying statistics and a Currently Watching module.

44. A system as recited in claim 38 wherein the plurality of user-selectable modules comprises a sports module that displays sporting events and the statistics for the current event and related events and further wherein the display displays a score toggle button on the second screen device for selectably displaying and not displaying the statistics.

45. A system as recited in claim 28 wherein the second screen device displays a remote control user interface having a touch screen button on the second screen device.

46. A system as recited in claim 45 wherein the second screen device generates a button signal corresponding to the touch screen button, and communicates the button signal to the set top box.

47. A system as recited in claim 45 wherein the second screen device displays advertisement data within the touch screen button.

* * * * *